United States Patent
Basso et al.

(10) Patent No.: US 11,250,537 B2
(45) Date of Patent: Feb. 15, 2022

(54) CONFIGURABLE AND PROGRAMMABLE IMAGE PROCESSOR UNIT

(71) Applicant: Google LLC, Mountain View, CA (US)

(72) Inventors: Fabrizio Basso, Morgan Hill, CA (US); Edward Chang, Saratoga, CA (US); Daniel Finchelstein, Redwood City, CA (US); Timothy Knight, Sunnyvale, CA (US); William Mark, Mountain View, CA (US); Albert Meixner, Mountain View, CA (US); Shahriar Rabii, Los Altos, CA (US); Jason Redgrave, Mountain View, CA (US); Masumi Reynders, Cupertino, CA (US); Ofer Shacham, Los Altos, CA (US); Don Stark, Palo Alto, CA (US); Michelle Tomasko, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 25 days.

(21) Appl. No.: 16/694,335

(22) Filed: Nov. 25, 2019

(65) Prior Publication Data
US 2020/0167890 A1 May 28, 2020

Related U.S. Application Data

(63) Continuation of application No. 15/595,289, filed on May 15, 2017, now Pat. No. 10,489,878.

(51) Int. Cl.
*G06T 1/20* (2006.01)
*G06K 9/00* (2006.01)
(Continued)

(52) U.S. Cl.
CPC ............ *G06T 1/20* (2013.01); *G06K 9/00221* (2013.01); *G06K 9/00335* (2013.01);
(Continued)

(58) Field of Classification Search
CPC ..... G06T 1/20; G06T 3/4015; G06K 9/00624; G06K 9/00335; G06K 9/00221; H04N 5/23267; H04N 5/217; H04N 5/23232
See application file for complete search history.

(56) References Cited

U.S. PATENT DOCUMENTS

| | | | |
|---|---|---|---|
| 4,955,024 A | 9/1990 | Pfeiffer et al. | |
| 6,642,956 B1 | 11/2003 | Safai | |

(Continued)

FOREIGN PATENT DOCUMENTS

| | | |
|---|---|---|
| JP | 2005-236717 | 9/2005 |
| JP | 2007-310883 | 11/2007 |

(Continued)

OTHER PUBLICATIONS

'www.hotchips.org' [online] "Movidius Myriad 2: Eye of the Computational Vision Storm" Barry et al., Hotchips 26, Aug. 12, 2014, [ retrieved on Aug. 24, 2017] Retrieved from Internet: URL< http://www.hotchips.org/wp-content/uploads/hc_archives/hc26/HC26-12-day2-epub/HC26.12-6-HP-ASICs-epub/HC26.12.620-Myriad2-Eye-Moloney-Movidius-provided.pdf> 18 pages.

(Continued)

*Primary Examiner* — Bobbak Safaipour
(74) *Attorney, Agent, or Firm* — Fish & Richardson P.C.

(57) ABSTRACT

An image processor unit is described. The image processor unit includes a plurality of inputs to receive at least one input image. The image processor unit includes a plurality of outputs to provide at least one output image. The image processor unit includes a network coupled to the plurality of inputs and the plurality of outputs. The network is to couple at least one of the inputs to at least one of the outputs. The image processor unit includes an image processor circuit coupled to the network. The network to route an input image that is received at one of the inputs to the image processor circuit. The image processor circuit is to execute image (Continued)

signal processing program code to generate a processed output image from the input image. The network is to route the processed output image to at least one of the outputs.

20 Claims, 37 Drawing Sheets

(51) Int. Cl.
  *H04N 5/232* (2006.01)
  *H04N 5/217* (2011.01)
  *G06T 3/40* (2006.01)
(52) U.S. Cl.
  CPC ........ *G06K 9/00624* (2013.01); *G06T 3/4015* (2013.01); *H04N 5/217* (2013.01); *H04N 5/23232* (2013.01); *H04N 5/23267* (2013.01)

(56) References Cited

U.S. PATENT DOCUMENTS

| | | | |
|---|---|---|---|
| 10,204,396 B2* | 2/2019 | Meixner | G06F 9/30138 |
| 10,313,641 B2* | 6/2019 | Redgrave | G06F 15/173 |
| 10,321,077 B2* | 6/2019 | Desai | G06T 1/60 |
| 10,334,194 B2* | 6/2019 | Meixner | G06F 17/16 |
| 2006/0221230 A1 | 10/2006 | Dutta et al. | |
| 2008/0273029 A1* | 11/2008 | Brennan | G06T 15/405 345/420 |
| 2008/0273032 A1* | 11/2008 | Brennan | G06T 1/60 345/421 |
| 2012/0081385 A1 | 4/2012 | Cote et al. | |
| 2015/0091916 A1 | 4/2015 | Park et al. | |
| 2016/0037058 A1 | 2/2016 | Silverstein et al. | |
| 2016/0313984 A1* | 10/2016 | Meixner | G06F 9/30134 |
| 2016/0314555 A1 | 10/2016 | Zhu et al. | |
| 2016/0316107 A1* | 10/2016 | Shacham | G06F 9/30036 |
| 2016/0316157 A1* | 10/2016 | Desai | H04N 5/91 |
| 2017/0163931 A1* | 6/2017 | Redgrave | G06F 15/8015 |
| 2017/0277658 A1* | 9/2017 | Pratas | G06F 12/0862 |
| 2018/0005061 A1* | 1/2018 | Chang | G06T 1/20 |
| 2018/0315156 A1* | 11/2018 | Shin | G06T 3/40 |
| 2018/0329864 A1* | 11/2018 | Redgrave | G06F 1/3243 |
| 2018/0330465 A1* | 11/2018 | Redgrave | G06F 12/0813 |
| 2018/0330466 A1* | 11/2018 | Basso | H04N 5/217 |
| 2018/0330467 A1* | 11/2018 | Park | G06T 1/60 |
| 2019/0130205 A1* | 5/2019 | Shoji | G06T 5/007 |

FOREIGN PATENT DOCUMENTS

| | | |
|---|---|---|
| JP | 2014-222473 | 11/2014 |
| JP | 2016-519822 | 7/2016 |
| KR | 20120107041 | 9/2012 |
| KR | 20150039299 | 4/2015 |
| TW | 201640422 A | 11/2016 |
| WO | WO 2016/171909 | 10/2016 |

OTHER PUBLICATIONS

'www.prnewswire.com' [online] "1,000,000 Plays of Rockchip Visual Platform RV1108 CES Viral Videos," Jan. 5, 2017, [retrieved on Aug. 24, 2017] Retrieved from Internet: URL< http://www.prnewswire.com/news-releases/1000000-plays-of-rockchip-visual-platform-rv1108-ces-viral-videos-300386038.html> 4 pages.
'chinagadgetsreview.com' [online] "Rockchip VR Camera Solution released in CES 2017," Jan. 8, 2017, [retrieved on Aug. 24, 2017] Retrieved from Internet: URL< http://chinagadgetsreviews.com/rockchip-vr-camera-solution-released-ces-2017.html> 10 pages.
'rockchip.wikidot.com' [online] "RV1108," Last update date unknown [retrieved on Aug. 24, 2017] Retrieved from Internet: URL< http://rockchip.wikidot.com/rk1108> 4 pages.
'uploads.movidius.com' [online] "Myriad 2 MA2x5x Vision Processor: VPU Product Brief," Apr. 2016, [retrieved on Aug. 24, 2017] Retrieved from Internet: URL< https://uploads.movidius.com/1463156689-2016-04-29_VPU_ProductBrief.pdf> 2 pages.
'www.anandtech.com' [online] "ARM Announces Mali-C71: Their First Automotive-Grade Image Signal Processor," Apr. 25, 2017, [retrieved on Mar. 22, 2018] Retrieved from Internet: URL<https://www.anandtech.com/show/11293/arm-announces-mali-c71-automotive-isp> 7 pages.
'www.cnx-software.com' [online] "Rockchip RV1108 Visual Processor is Designed for 1080p & 2K Camera Applications," Jan. 9, 2017, [retrieved on Aug. 24, 2017] Retrieved from Internet: URL< https://www.cnx-software.com/2017/01/09/rockchip-rv1108-visual-processor-is-designed-for-1080p-2k-camera-applications/> 8 pages.
'www.eeweb.com' [online] "Camera Front Engine from Milbeaut Image Processor Series," Mar. 29, 2016, [retrieved on Aug. 24, 2017] Retrieved from Internet: URL<https://www.eeweb.com/company-news/socionext/new-camera-front-engine-from-milbeaut-image-processor-series> 3 pages.
'www.hotchips.org' [online] "Movidius Myriad 2: Eye of the Computational Vision Storm" Barry et al., Hotchips 26, Aug. 12, 2014, [ retrieved on Aug. 24, 2017] Retrieved from Internet: URL< http://www.hotchips.org/wp-content/uploads/hc_archives/hc26/HC26-12-day2-epub/HC26.12-6-HP-ASICs-cpub/HC26.12.620-Myriad2-Eyc-Moloncy-Movidius-provided.pdf> 18 pages.
'www.pmewswire.com' [online] "1,000,000 Plays of Rockchip Visual Platform RV1108 CES Viral Videos," Jan. 5, 2017, [retrieved on Aug. 24, 2017] Retrieved from Internet: URL< http://www.prnewswire.com/news-releases/1000000-plays-of-rockchip-visual-platform-rv1108-ces-viral-videos-300386038.html> 4 pages.
'www.rock-chips.com' [online] "Application of RC1108 solution | Dual-eye 360 degree 3K panoramic video camera solution on show in Hong Kong and attracts attention!"Rockchip Press Release, Apr. 14, 2017, [retrieved on Aug. 24, 2017] Retrieved from Internet: URL< http://www.rock-chips.com/a/en/News/Press_Releases/2017/0414/848.html> 4 pages.
Barry et al. "Always-on Vision Processing Unit for Mobile Applications," IEEE Micro 35.2, Mar. 2015, 11 pages.
Batlle et al. "A New FPGA/DSP-Based Parallel Architecture for Real-Time Image Processing," Real-Time Imaging, vol. 8(5) Oct. 1, 2002, 12 pages.
Freescale Semiconductor, Inc.,"i.MX35 Applications Processors for Industrial and Consumer Products," Freescale Semiconductor Data Sheet: Technical Data, Document No. MCIMX35SR2SEC, Rev. Jun. 10, 2012, 147 pages.
PCT International Preliminary Report on Patentability issued in International Application No. PCT/US2018/013054, dated Nov. 28, 2019, 11 pages.
PCT International Search Report and Written Opinion issued in International Application No. PCT/US2018/013054, dated Apr. 9, 2018, 19 pages.
TW Office Action issued in Taiwanese Application No. 107103419, dated Mar. 7, 2019, 8 pages (English translation).
JP Office Action in Japanese Application No. 2019-544742, dated Dec. 24, 2020, 15 ages (with English translation).
KR Office Action in Korean Application No. 10-2019-7024070, dated Dec. 22, 2020, 14 pages (with English Translation).
CN Office Action in Chinese Application No. 107103419, dated Mar. 9, 2020, 7 pages (with English translation).
IN Office Action in Indian Appln. No. 201947030902, dated Jun. 17, 2021, 6 pages.
KR Notice of Allowance in Korean Application No. 10-2019-7024070, dated Jun. 1, 2021, 5 pages (with English Translation).

* cited by examiner

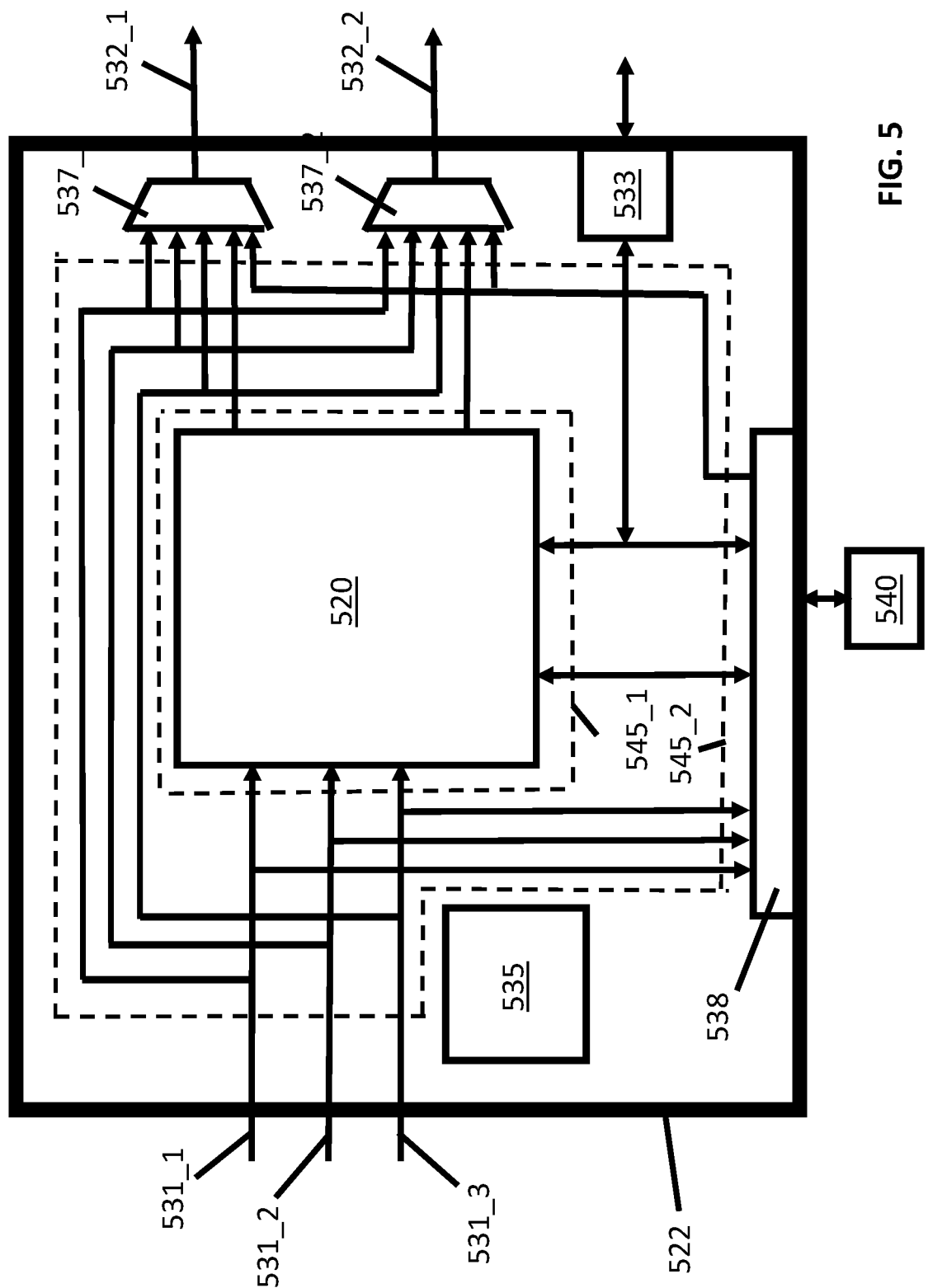

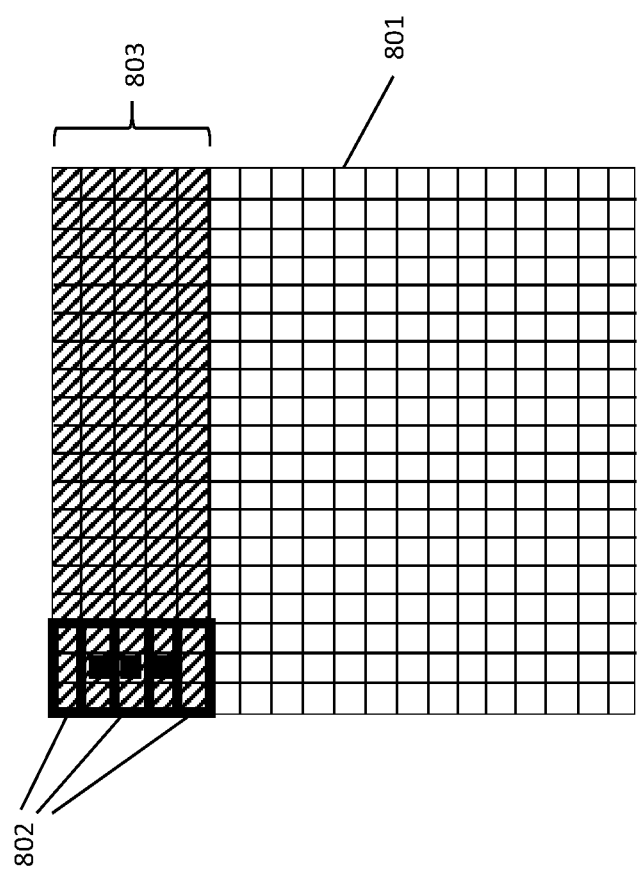

| Scalar instruction 951 | 2D ALU Instruction 952 | Memory Access Instruction 953 | Immediate Operand 954 |

Fig. 9b

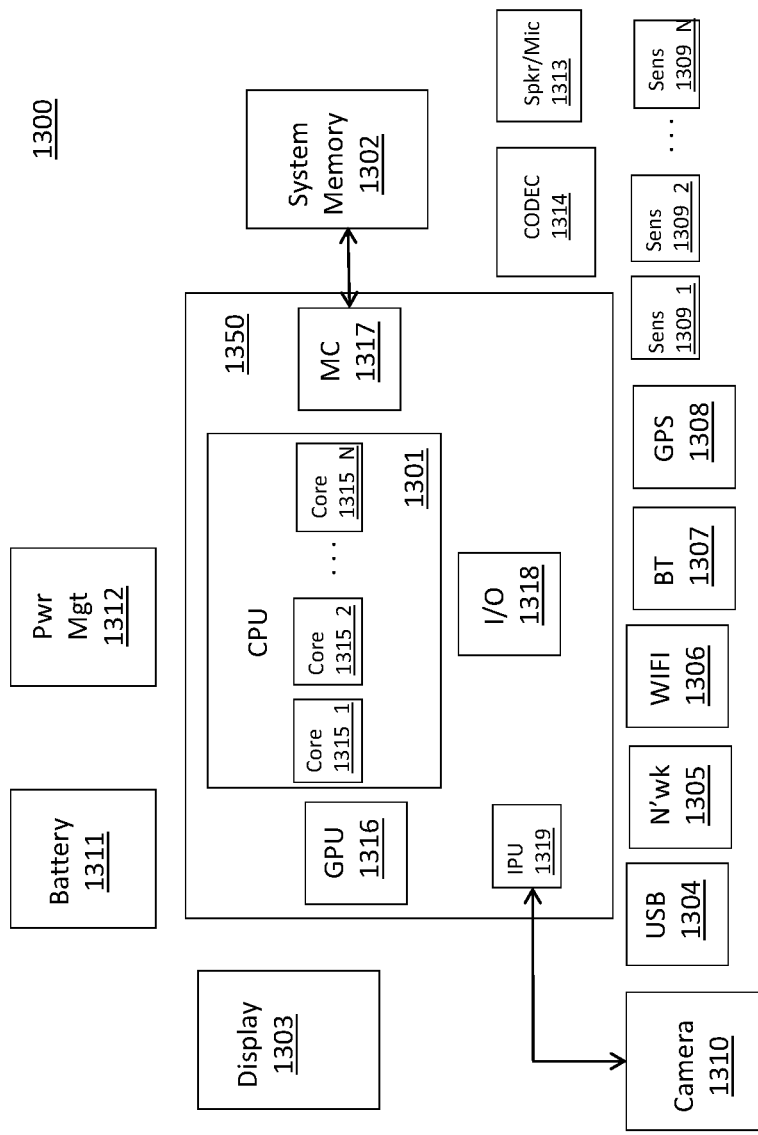

CONFIGURABLE AND PROGRAMMABLE IMAGE PROCESSOR UNIT

CROSS-REFERENCE TO RELATED APPLICATION

This is a continuation of U.S. application Ser. No. 15/595,289, filed on May 15, 2017, the disclosure of which is considered part of and is incorporated by reference in the disclosure of this application.

FIELD OF INVENTION

The field of invention pertains generally to the computing sciences and, more specifically, to a configurable and programmable image processor unit.

BACKGROUND

Image processing typically involves the processing of pixel values that are organized into an array. Here, a spatially organized two dimensional array captures the two dimensional nature of images (additional dimensions may include time (e.g., a sequence of two dimensional images), depth (e.g., of an intermediate layer in a convolutional neural network) and data type (e.g., colors)). In a typical scenario, the arrayed pixel values are provided by a camera that has generated a still image or a sequence of frames to capture images of motion. Traditional image processors typically fall on either side of two extremes.

A first extreme performs image processing tasks as software programs executing on a general purpose processor or general purpose-like processor (e.g., a general purpose processor with vector instruction enhancements). Although the first extreme typically provides a highly versatile application software development platform, its use of finer grained data structures combined with the associated overhead (e.g., instruction fetch and decode, handling of on-chip and off-chip data, speculative execution) ultimately results in larger amounts of energy being consumed per unit of data during execution of the program code.

A second, opposite extreme applies fixed function hardwired circuitry to much larger blocks of data. The use of larger (as opposed to finer grained) blocks of data applied directly to custom designed circuits greatly reduces power consumption per unit of data. However, the use of custom designed fixed function circuitry generally results in a limited set of tasks that the processor is able to perform. As such, the widely versatile programming environment (that is associated with the first extreme) is lacking in the second extreme.

A technology platform that provides for both highly versatile application software development opportunities combined with improved power efficiency per unit of data remains a desirable yet missing solution.

SUMMARY

An image processor unit is described. The image processor unit includes a plurality of inputs to receive at least one input image. The image processor unit includes a plurality of outputs to provide at least one output image. The image processor unit includes a network coupled to the plurality of inputs and the plurality of outputs. The network is to couple at least one of the inputs to at least one of the outputs. The image processor unit includes an image processor circuit coupled to the network. The network to route an input image that is received at one of the inputs to the image processor circuit. The image processor circuit is to execute image signal processing program code to generate a processed output image from the input image. The network is to route the processed output image to at least one of the outputs.

FIGURES

The following description and accompanying drawings are used to illustrate embodiments of the invention. In the drawings:

FIG. 5 shows an embodiment of an image processor unit;

FIGS. 8a, 8b, 8c, 8d and 8e depict the parsing of image data into a line group, the parsing of a line group into a sheet and the operation performed on a sheet with overlapping stencils;

FIG. 9b shows an embodiment of an instruction word of the stencil processor;

FIG. 13 shows an exemplary computing system.

DETAILED DESCRIPTION

1.0 Current Image Signal Processor System Integration

Figure 1A:
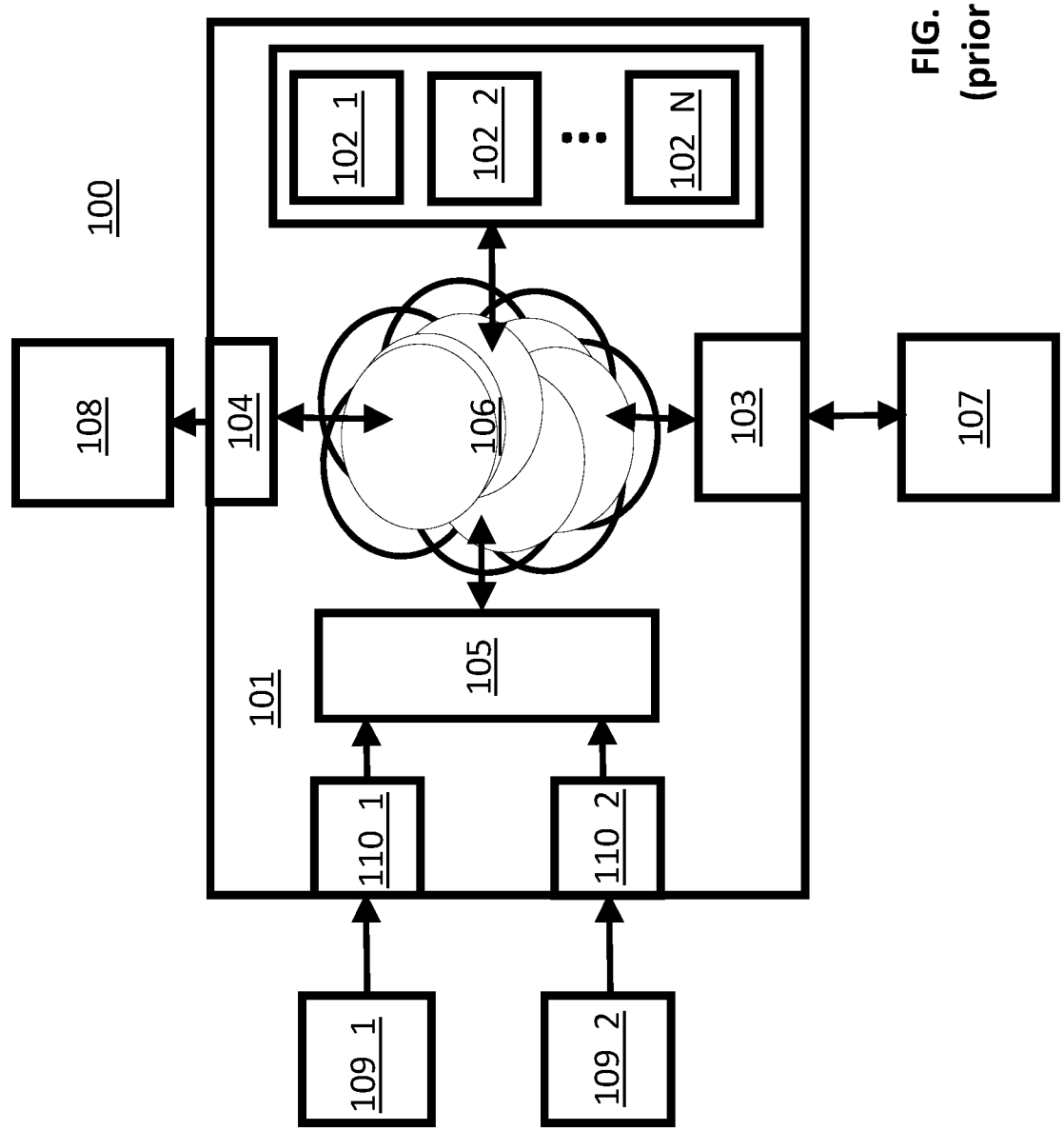
FIGS. 1a, 1b and 1c show a prior art computing system and integration of its image signal processing function.

FIG. 1a shows a typical design 100 for a mobile computing system such as a smartphone. As observed in FIG. 1, the computing system includes a large scale system on chip (SOC) 101 (also referred to as an applications processor) that contains many basic computing system elements. These include one or more general purpose processing cores 102_1 through 102_N, a main memory controller 103, a display interface 104, a peripheral or "I/O" control hub 105 and an internal network 106. The main memory controller 103 interfaces to a main memory 107 (also referred to as system memory). The display interface 104 provides output data to be displayed on a display 108 such as a flat panel touch screen.

The internal network 106 provides for, e.g., passing of data between various ones of the applications processor's components 102-105. For instance, the internal network 106 permits program code instructions and data for the software being executed by the processing cores 102 to be passed from main memory 107 through the main memory controller 103 to the processing cores 102. Likewise, any data that is created by the executing software may be passed from the processing cores 102 to main memory 107 through the main memory controller 103. Further still, data to be displayed on display 108 may be, e.g., read from main memory 107 by the main memory controller 103 and forwarded to the display interface 104.

Other basic data movements include the passing of data generated or received at a peripheral device through the peripheral control hub 105 to the main memory controller 103 for writing into main memory 107, or, to the processing cores 102 for processing by system software, or, to the display interface 104 for presentation on the display 108. Although not depicted in FIG. 1, one or more network interfaces (such as a cellular network interface, a wireless local area network interface (e.g., a WiFi interface), or point-to-point link interfaces (e.g., a Bluetooth interface) may be coupled to the peripheral control hub 105 so that data received from a network/link that the computing system is connected to may be directed according to any of the data flows described just above.

Note that the peripheral control hub 105 is not necessarily required. That is, some or all peripheral devices may be coupled to the network 106 without an intermediary peripheral control hub. For ease of discussion the remainder of the present discussion will assume the presence of a peripheral control hub 105. The internal network 106 may be composed of one or more interconnected networks of various network topologies (e.g., ring, crossbar switch, multi-drop bus, etc.)

As depicted in FIG. 1a, a pair of cameras 109_1, 109_2 that are each respectively coupled to its own image signal processor 110_1, 110_2 on the applications processor 101 make up part of the system's peripheral or I/O complex. Here, for instance, a first camera 109_1 may be a front side camera that resides on a front surface of a smartphone, and, a second camera 109_2 may be a back side camera that resides on a back surface of the smartphone. The cameras 109_1, 109_2 typically generate "raw" (RAW) unprocessed or modestly processed raster scan streams of red (R), green (G) and blue (B) pixels. In more advanced systems the cameras may also provide infra-red pixel streams and/or depth information (e.g., time-of-flight) pixel or other signal streams. The streams are typically formatted so that individual image frames are discernable from them. The raw images are then processed by the image signal processors 110_1, 110_2.

Typical processes performed by image signal processors 110_1, 110_2 include offset correction, noise reduction, auto-white balancing, demosaicing, sharpening, lens shading correction and color correction. Other processes may include various resizing operations such as up conversion or down conversion to enlarge or reduce image dimensions or compression to reduce the image data footprint/size. Typically, the image signal processors 110_1, 110_2 process the images into a non-raw industry standard format such as JPEG or TIFF (for still figures) or MPEG (for video image streams).

Figure 1B:
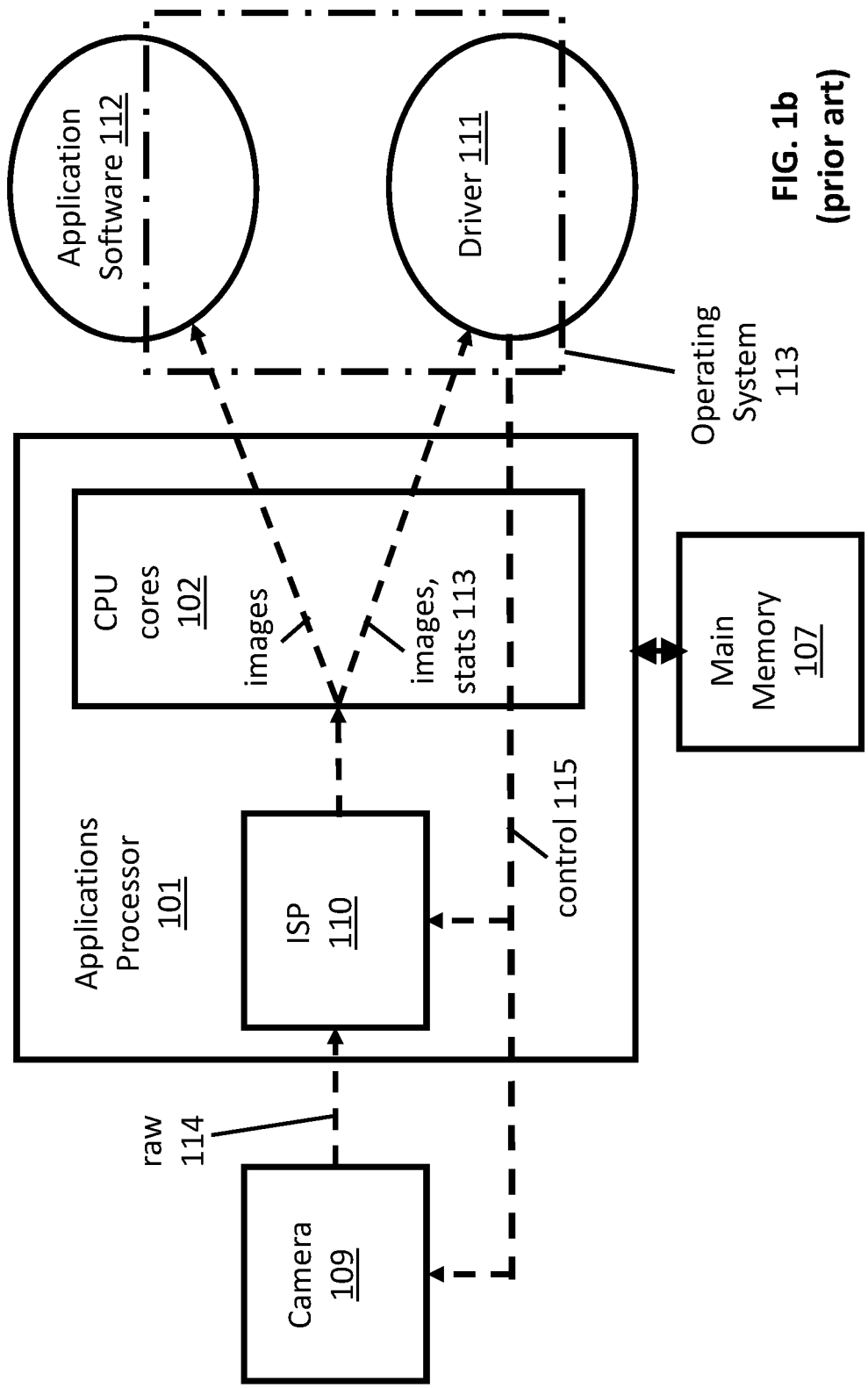

FIG. 1b shows typical image data flows within a computing system such as the computing system of FIG. 1a. As observed in FIG. 1b (and as discussed above), raw image data 114 is generated by a camera 109 and forwarded to an image signal processor 110 that resides on the applications processor 101. The image signal processor 110 then generates, e.g., an industry standard formatted still image or video stream.

The image signal processor 110 also generates various statistics for the images that it processes (e.g., average pixel value, maximum pixel value, minimum pixel value, etc. for any/all of its input and/or output streams/images). Both the images and the statistics are processed by camera driver software 111 that executes on one or more of the computing system's CPU cores 102. Upon processing the images and statistics, the driver software generates control signals 115 that are passed back to the image signal processor 110 (e.g., to control the image signal processor's auto-white balancing, lens shading correction or color correction processes) and camera 109 (e.g., to control the camera's auto-focusing mechanism or auto-exposure settings).

The images from the image signal processor 110 are also commonly passed to an application software program 112 that executes on the processing cores 102 (e.g., a camera application, a video chat application, etc.) and/or passed to the system display. Note that both the images and statistics are commonly stored in main memory 107 after being generated by the image signal processor. Subsequently, the images and statistics are read from main memory 107 by the driver/application that is executing on the CPU cores 102 for further processing/use, and/or, are read from main memory 107 and passed to the display for presentation on the display.

Referring back to FIG. 1a, the image processors 110_1, 110_2 often operate on stencils of the raw image data. Here, as is known the art, a stencil is a slice of image surface area (also referred to as a "block") that is used as a fundamental data unit. For example, a new value for a particular "output" pixel location in an output image being created by image signal processor 110_1 may be calculated as an average of the pixel values in an area of the raw input image data that surrounds the particular pixel location. For example, if the stencil has a dimension of 3 pixels by 3 pixels, the particular output pixel location may correspond to the middle pixel of a 3×3 pixel array of the raw input image data and the average may be calculated over all nine pixels within the 3×3 raw pixel array. Here, different stencil sizes and/or different functions to be performed over stencils may be desired. As such, ideally, the image processors 110_1, 110_2 are able to readily provide for some form of user-definition and/or programmability of the functions that they perform.

Unfortunately, image signal processors 110_1, 110_2 are not well suited for performing user defined or programmable operations. That is, in order to acceptably perform their image processing improvements over a wide range of application possibilities, the image signal processors 110_1, 110_2 should be easily configurable so that they can perform various processing algorithms over various stencil sizes and imaging conditions, etc. Additionally, especially in the case of battery powered devices such as smartphones, the processing of the algorithms should consume less power rather than more power. As discussed in the background, however, and in particular to operations performed over stencils, image signal processors 110_1, 110_2 are either hardwired ASIC-like and therefore consume less power but are not very versatile, or, are more traditional processor-like and although being more versatile, consume too much power.

Figure 1C:
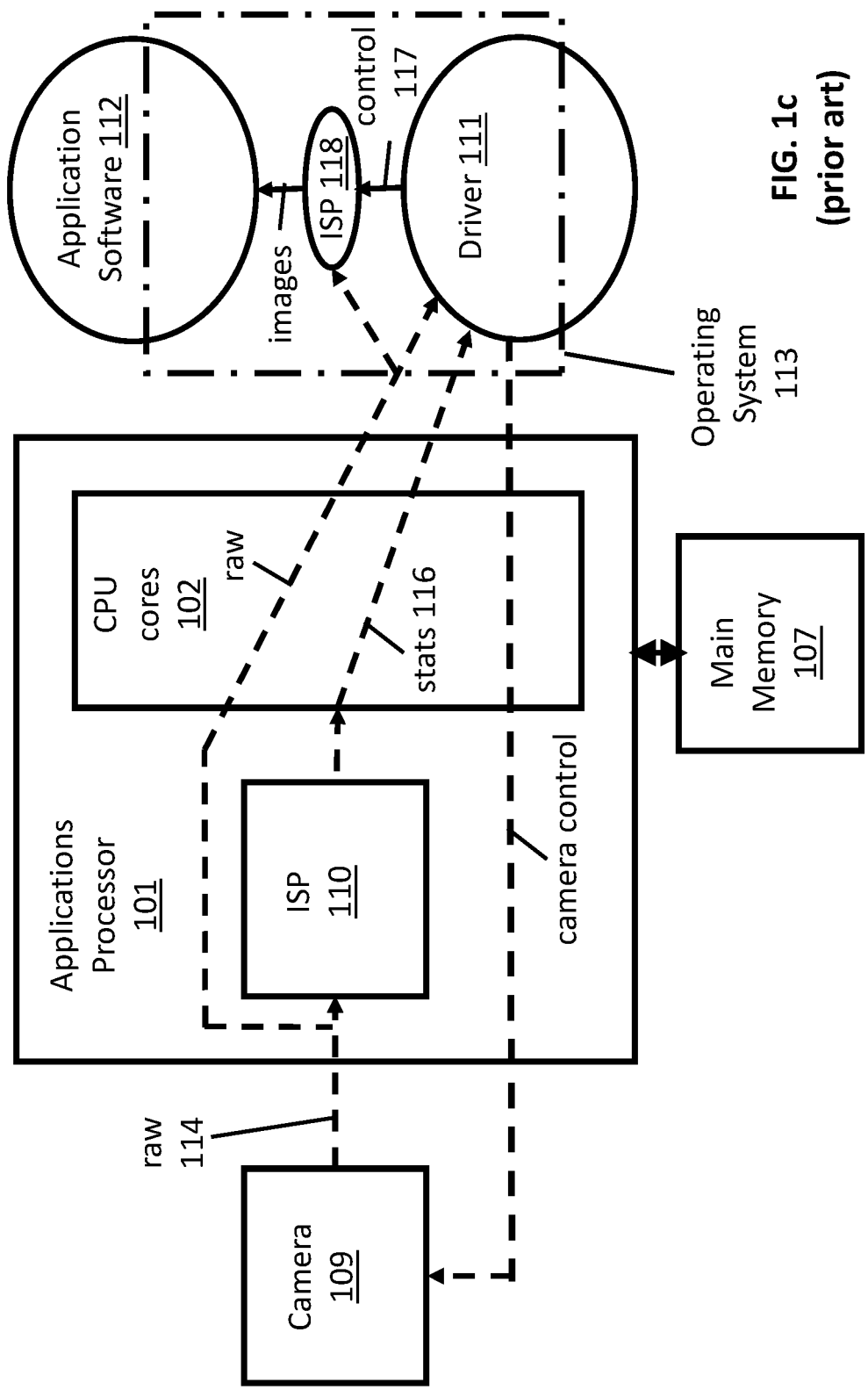

Referring to FIG. 1c, in yet other data flow scenarios, the embedded image signal processor 110 on the applications processor 101 is largely or entirely bypassed (not used) for image processing purposes and is primarily used only for statistics generation 116. Here, raw image data 114 from the camera 109 is written to main memory for subsequent processing by program code that executes on the CPU core(s) 102. Camera driver software 111 executing on the CPU core(s) 102 generates control signals 117 for, e.g., auto-white balancing, lens correction, and color correction from the raw image data. Higher level software 118, e.g., within the operating system 112 executing on one or more of the CPU cores 102 and in lieu of the embedded image signal processor 109, performs the actual image processing from the raw data to generate, e.g., JPEG/MPEG imagery (e.g., the higher level software 118 performs offset correction, noise reduction, auto-white balancing, demosaicing, sharpening, lens shading correction, color correction, tone mapping and time-frequency transforms (e.g., Fourier transforms including fast Fourier transforms, etc.).

Here, the decision to bypass the embedded image signal processor 109 and instead perform image processing on the CPU core(s) 102 may be some combination of the required processing power and memory capacity needed to perform more sophisticated or complex image processing tasks. That is, the CPU processing cores 102 generally possess greater overall processing capability, versatility and memory allocation than the embedded image signal processor 109. As such, more complex image processing technology may instead be implemented on the CPU cores 102 rather than on the embedded image signal processor 109.

One such sophisticated image processing technology, referred to as HDR+ and which is a component in systems having the Android operating system offered by Google, Inc. of Mountain View, Calif., queues a running stream of image frames from the camera 109 and performs specific operations over the frames in the queue. For example, more image frames in the queue are used to capture underexposed portions of an image while less image frames in the queue are used to capture overexposed portions of the image. By blending the different portions together the overall dynamic range (the ability to capture both strong and weak signals) of the image capture process is enhanced. As another example, in order to reduce blurring from image and/or camera movement, HDR+ will analyze each of the images in the queue to determine a best shot that has the least blurred content. HDR+ also formats RGB to YUV, Y'UV, YCbCr or any other color space format that takes human perception into account. As alluded to above, however, performing complex operations on traditional general purpose processors, such as processing cores 102, increases the power consumption of the technology implementation.

2.0 New Image Processor Architecture

As is known in the art, the fundamental circuit structure for executing program code includes an execution stage and register space. The execution stage contains the execution units for executing instructions. Input operands for an instruction to be executed are provided to the execution stage from the register space. The resultant that is generated from the execution stage's execution of an instruction is written back to the register space.

Execution of a software thread on a traditional processor entails sequential execution of a series of instructions through the execution stage. Most commonly, the operations are "scalar" in the sense that a single resultant is generated from a single input operand set. In the case of "vector" processors the execution of an instruction by the execution stage will generate a vector of resultants from a vector of input operand sets.

Figure 2:
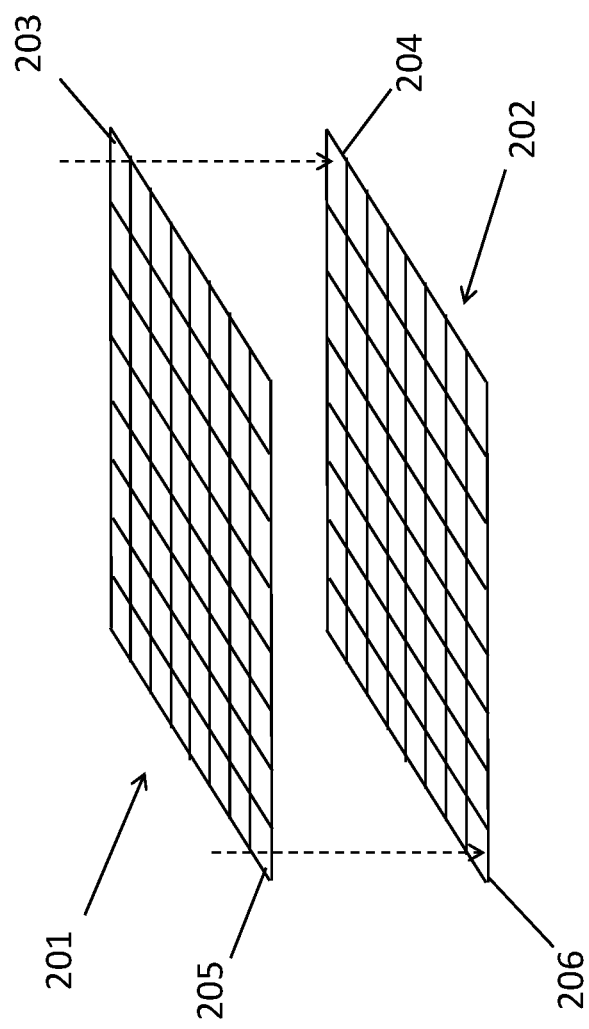
FIG. 2 shows a depiction of an execution lane array and a two dimensional shift register array for a new image processor architecture.

FIG. 2 shows a depiction of the instruction execution resources and the register resources of a unique image processor architecture 200 that includes an array of execution lanes 201 in hardware coupled to a two-dimensional shift register array 202 in hardware. In the processor architecture of FIG. 2, each execution lane in the execution lane array 201 can be viewed as a discrete execution stage that contains the execution units needed to execute the instruction set supported by the processor 200. In various embodiments each execution lane receives a same instruction to execute in a same machine cycle so that the processor operates as a two dimensional single instruction multiple data (SIMD) processor.

Additionally, each execution lane has its own dedicated register space in a corresponding location within the two dimensional shift register array 202. For example, corner execution lane 203 has its own dedicated register space in corner shift register location 204, corner execution lane 205 has its own dedicated register space in corner shift register location 206, etc.

Further still, the shift register array 202 is able to shift its contents so that each execution lane is able to directly operate, from its own register space, upon a value that was resident in another execution lane's register space during a prior machine cycle. For example, a +1 horizontal shift causes each execution lane's register space to receive a value from its leftmost neighbor's register space. On account of an ability to shift values in both left and right directions along a horizontal axis, and shift values in both up and down directions along a vertical axis, the processor is able to efficiently process stencils of image data. That is, traditional processors tend to re-read same data values multiple times over when processing over a stencil which leads to increased power consumption. By contrast, the architecture of the processor of FIG. 2 is more adept at reading a value from memory once and reusing it many times over while it remains in register space.

According to various operational embodiments of the processor 200 of FIG. 1, each execution lane of the execution lane array 201 is responsible for calculating a pixel value for a particular location in an output image that the processor is generating. Thus, continuing with the 3×3 stencil averaging example mentioned above, after an initial loading of input pixel data and a coordinated shift sequence of eight shift operations within the shift register array 202, each execution lane in the execution lane array 201 will have received into its local register space all nine pixel values needed to calculate the average for its corresponding pixel location.

The processor executes program code and is therefore widely configurable/adaptable. Additionally, as alluded to above, because image data is called into register space from memory and kept there until its usage is largely (or entirely) exhausted, the processor consumes significantly less power than a traditional processor. Because the processor architecture of FIG. 2 is particularly adept at processing over image stencils as a consequence of its two-dimensional arrayed structure it may also be referred to as a stencil processor.

3.0 System Integration of New Image Processor

Figure 3:
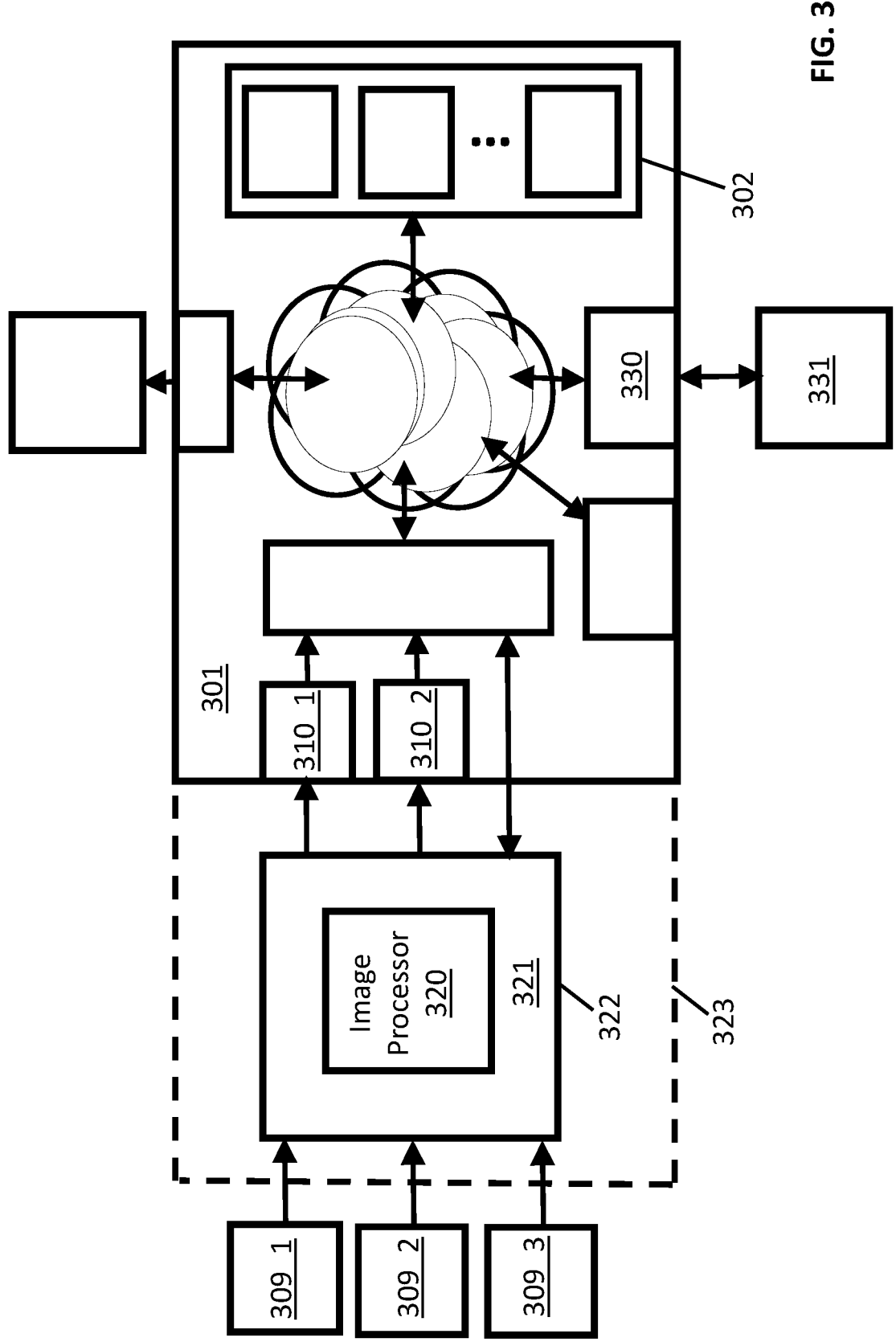
FIG. 3 shows a high level view of an image processor unit's integration into a system.

FIG. 3 shows an improved computing system design that includes an image processor 320 having an execution lane array and two dimensional shift register as described just above. As observed in FIG. 3, the image processor 320 and its surrounding logic 321 is inserted between the cameras 309 and the applications processor 301.

As depicted, the image processor 320 and its surrounding logic 321 is implemented as a discrete image processor chip 322 that receives raw input data from one or more cameras 309 and provides any of raw camera data, processed raw camera data and/or associated statistics to the applications processor 301. The dashed border 323 indicates that in some embodiments the image processor 320 and its surrounding logic 321 may be integrated onto the applications processor 301. In still yet other embodiments, although not depicted, the image processor 320 and its surrounding logic 321 may be integrated into one of the cameras 309 (and other "client" cameras pass their raw data to the "host" camera having the image processor). As such, the image processor 320 and its surrounding logic 321 may be more generally referred to as an image processor unit 322. For simplicity, however, the remainder of the discussion will refer to an embodiment in which the image processor 320 and its surrounding logic 321 are implemented as a discrete semiconductor chip 322.

In various configurations, the image processor 320 is able to perform image processing tasks on the raw image data generated by the cameras 309 with lower power consumption, greater processing performance and/or greater versatility than a traditional embedded image signal processor 310 that is integrated on the applications processor 301 and/or the application processor's general purpose CPU core(s) 301. Note that the general purpose processing cores 302, main memory controller 330 and main memory 331 can be viewed as primary components of a host system for the overall computing system. That is, generally, the overall computing system can be viewed as including a host system that includes the general purpose processing cores 302 and the main memory subsystem (which includes the main memory controller 330 and main memory 331), whereas other more peripheral units such as the display, image processor unit 322 and cameras 309 are components that couple into the host system.

FIGS. 4a through 4h detail some possible configurations and uses of the image processor and its surrounding logic. For ease of discussion, the image processor 420 and its surrounding logic 421 will be collectively referred to as the image processor chip 422. However, it is pertinent to keep in mind that the circuitry of the image processor chip 422 may be integrated on the applications processor 401 or may even be integrated within one of the cameras 409.

FIGS. 4a through 4h also depict a system having three cameras 409_1, 409_2, 409_3. Here, for instance, the system corresponds to a smartphone in which one of the sides of the smartphone has a single camera 409_1 while the other side of the smartphone has two cameras 409_2, 409_3 (e.g., for stereoscopic photography, capturing wide vs. narrow field of view images, capturing color vs. monochromatic images, improving signal-to-noise (SNR) ratio, etc.).

As such, in the embodiments of FIGS. 4a through 4h, the image processor chip 422 has three inputs 431_1, 431_2, 431_3 (which may be implemented, e.g., as three discrete MIPI inputs) and two outputs 432_1, 432_2 (which may be implemented, e.g., as two discrete MIPI outputs) to, e.g., provide input streams to the pair of embedded image signal processors 410_1, 410_2 on the applications processor 401. Also, as will be described further below, the image processor chip includes a peripheral I/O interface 433 (such as a PCIe interface) so that the image processor chip 432 can be used, e.g., as a co-processor by one or more of the applications processor's general purpose CPU cores 402.

Figure 4A:
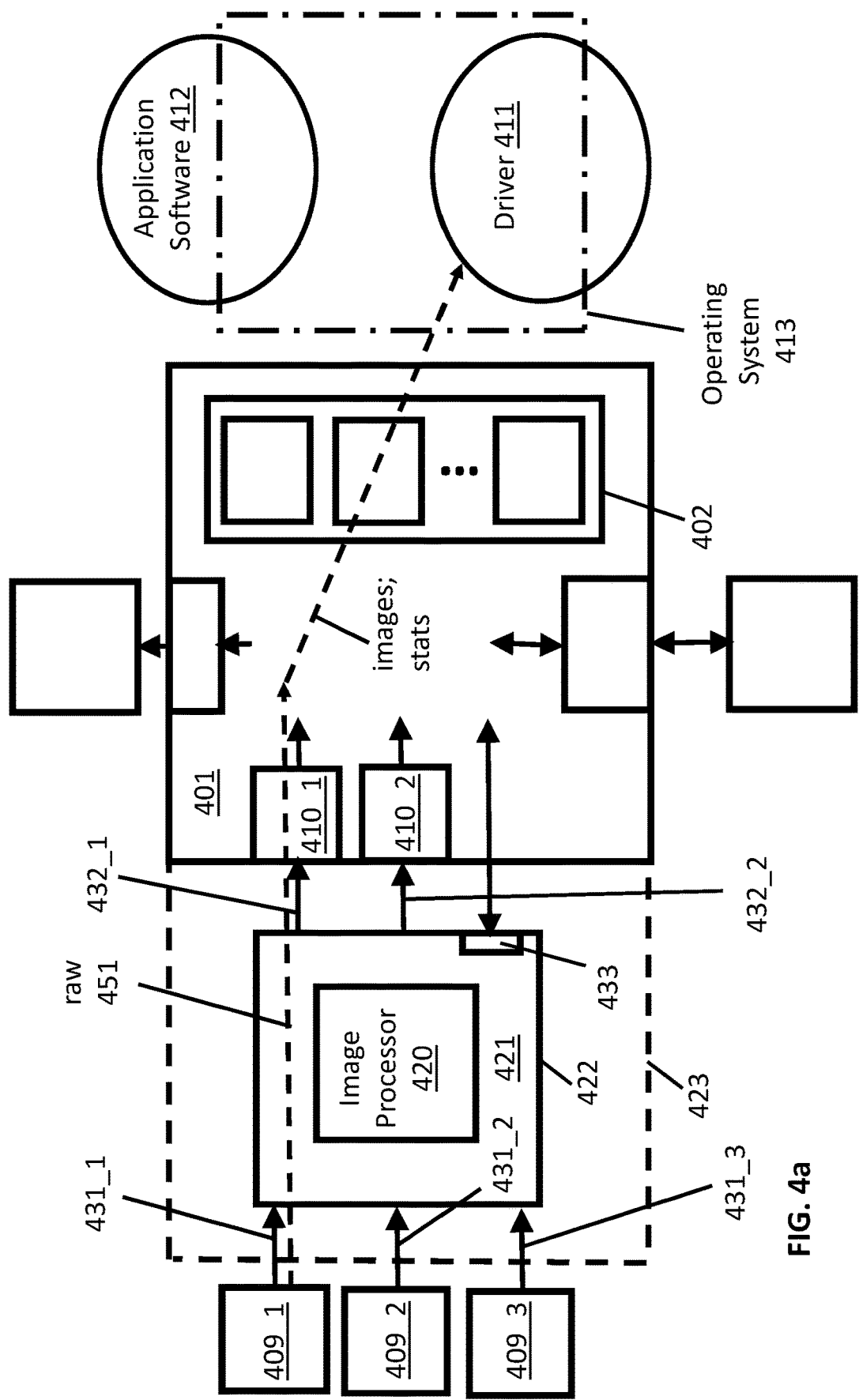
FIGS. 4a, 4b, 4c, 4d, 4e, 4f, 4g and 4h show different configurations of the image processor unit.

As observed in FIG. 4a, a first bypass mode is depicted in which the image processor 420 is not used. In this case, the image processor chip receives raw data 451 from one of the cameras 409_1 at one of its inputs 431_1 and forwards the same raw data 451 from one of its outputs 432_1 to an image signal processor 410_1 on the applications processor 401. The configuration of FIG. 4a is supported so that, e.g., the system can fall back to any of the traditional system configurations discussed above with respect to FIG. 1b. Here, the applications processor 401 and software driver 411 operate as described above with respect to FIG. 1b.

Figure 4B:
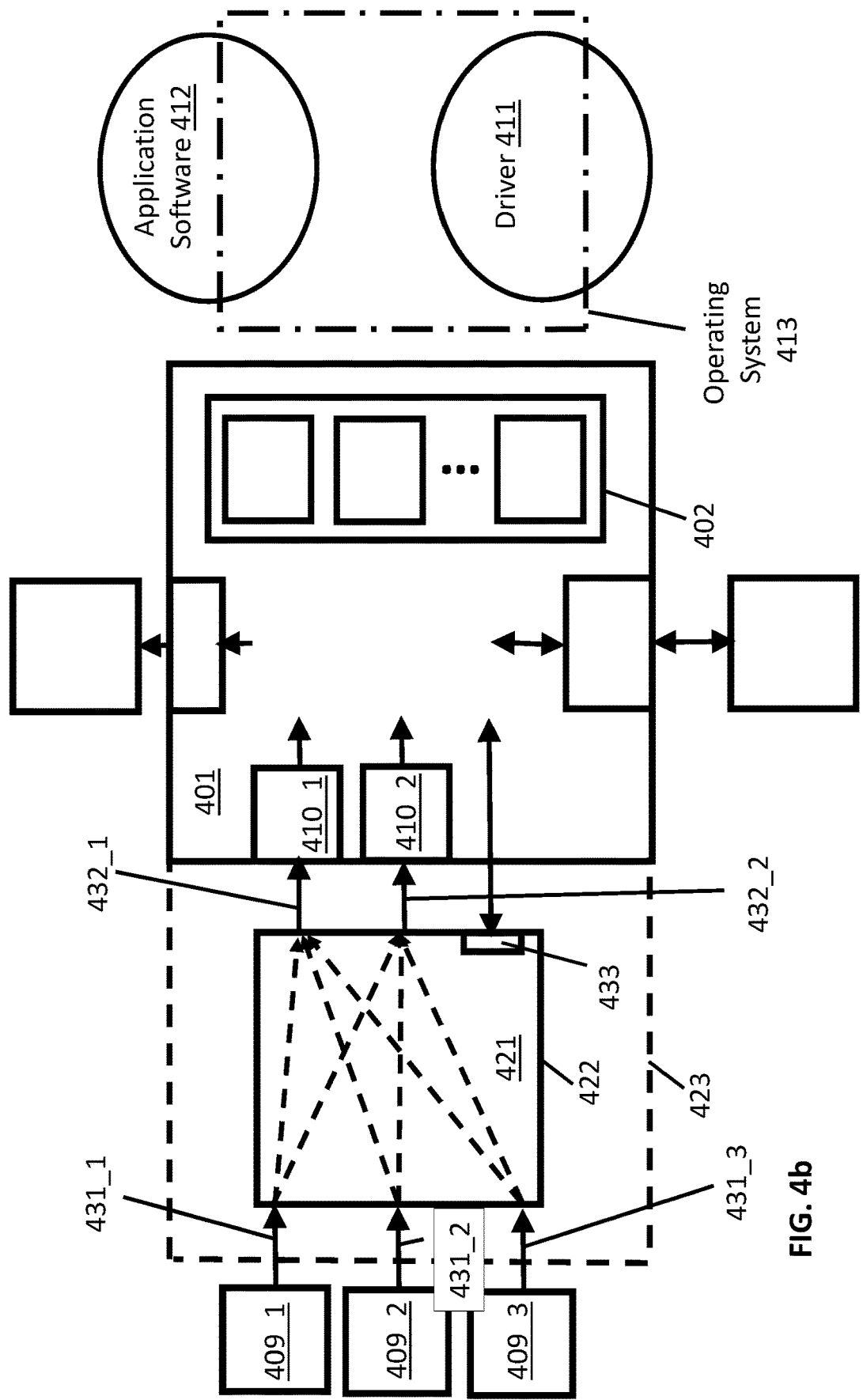

FIG. 4b shows the versatility of the image processor chip's ability to support different, multiple bypass configurations. As depicted in FIG. 4b, the image processor chip 422 can be viewed as a 3:2 multiplexer in which raw camera data that is provided to any of the chip's three MIPI inputs 431_1, 431_2, 431_3 may be forwarded to any of the chip's two outputs 432_1, 432_2. Note that this includes broadcast arrangements in which a single input image received at one of inputs 431_1, 431_2, 431_3 is concurrently routed to more than one of outputs 432_1, 432_2 (and may even be routed to peripheral interface 433 although this particular path is not explicitly shown in FIG. 4b). FIG. 4b can also be interpreted to include parallel arrangements in which two or more input images that are respectively received at inputs 431_1, 431_2, 431_3 are respectively routed to two or more outputs 432_1, 432_2, 433 (e.g., a first input image stream that is received at input 431_1 is routed to output 432_1 and a second input image stream that is concurrently received at input 431_2 is routed to output 432_2).

Figure 4C:
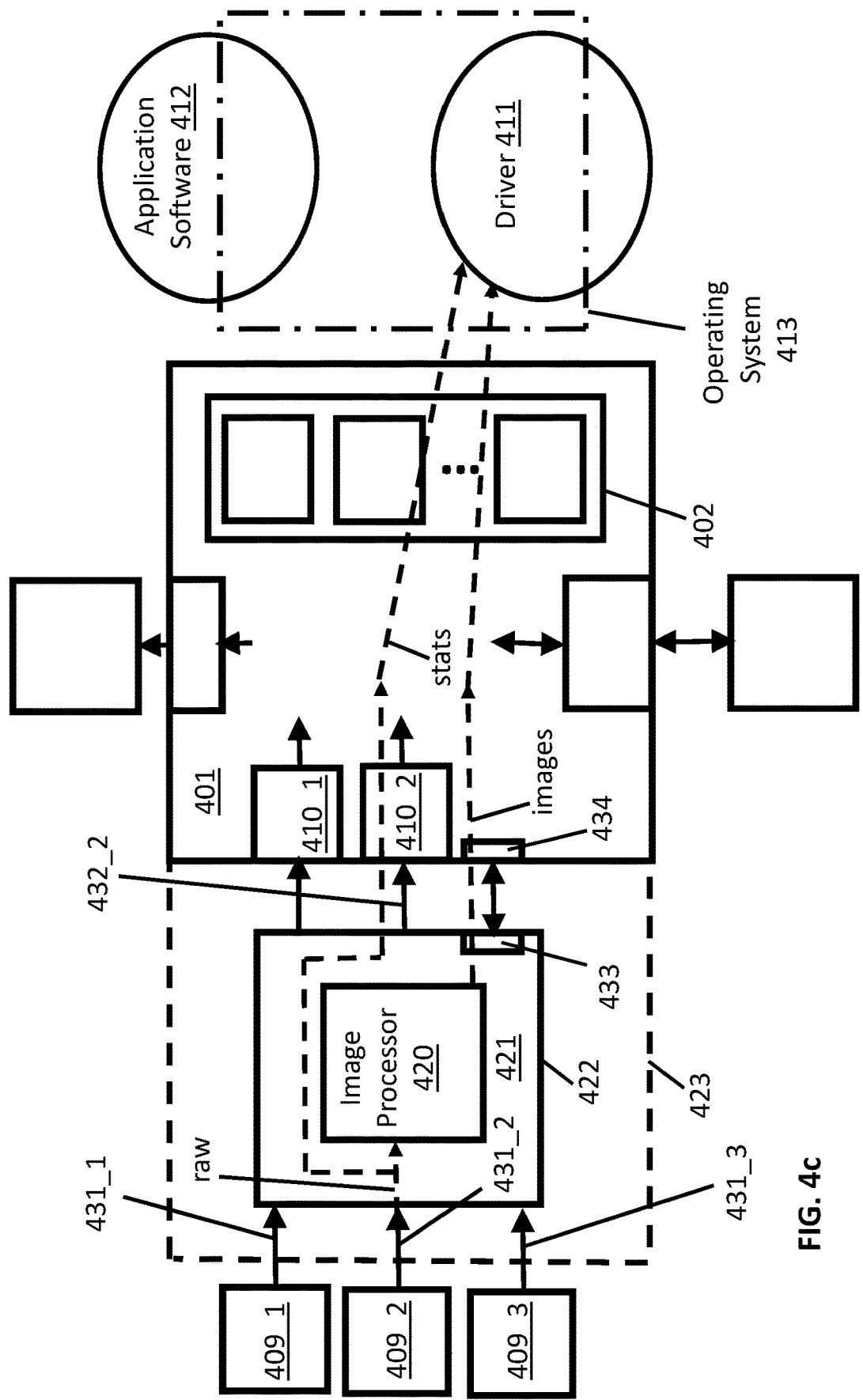

As observed in FIG. 4c, unlike the bypass modes of FIGS. 4a and 4b, the image processor 420 is used to process the images from a raw image stream, while, an image signal processor 410_2 on the applications processor 401 is used to process the statistics for the images. In this case, the raw image data from a camera 409_2 is directed within the image processor chip 422 to both the image processor 420 (for image processing) and one of the outputs 432_2 for receipt by the applications processor 401. In the configuration of FIG. 4c the image processor 420 effectively performs the image processing algorithms of an image signal processor (offset correction, noise reduction, auto-white balancing, demosaicing, sharpening, lens shading correction, color correction, tone mapping and time-frequency transforms (e.g., Fourier transforms including fast Fourier transforms, etc.) and provides, e.g., JPEG or TIFF still images or MPEG video images to the image processor chip's peripheral interface 433.

In the particular embodiment of FIG. 4c, because processed images are generated "before" the applications processor's embedded image signal processors 410_1, 410_2, the image processor chip 422 sends processed images to the applications processor from its peripheral interface 433 so that the processed images are received by the applications processor 401 through one of its standard peripheral interfaces such as a PCIe interface 434. Camera driver software 411 operates on the statistics and the images. Although not depicted in FIG. 4c, the camera driver software 411 sends control signals to the camera and image processor 420 based on the operations it performs on the received images and statistics.

Figure 4D:
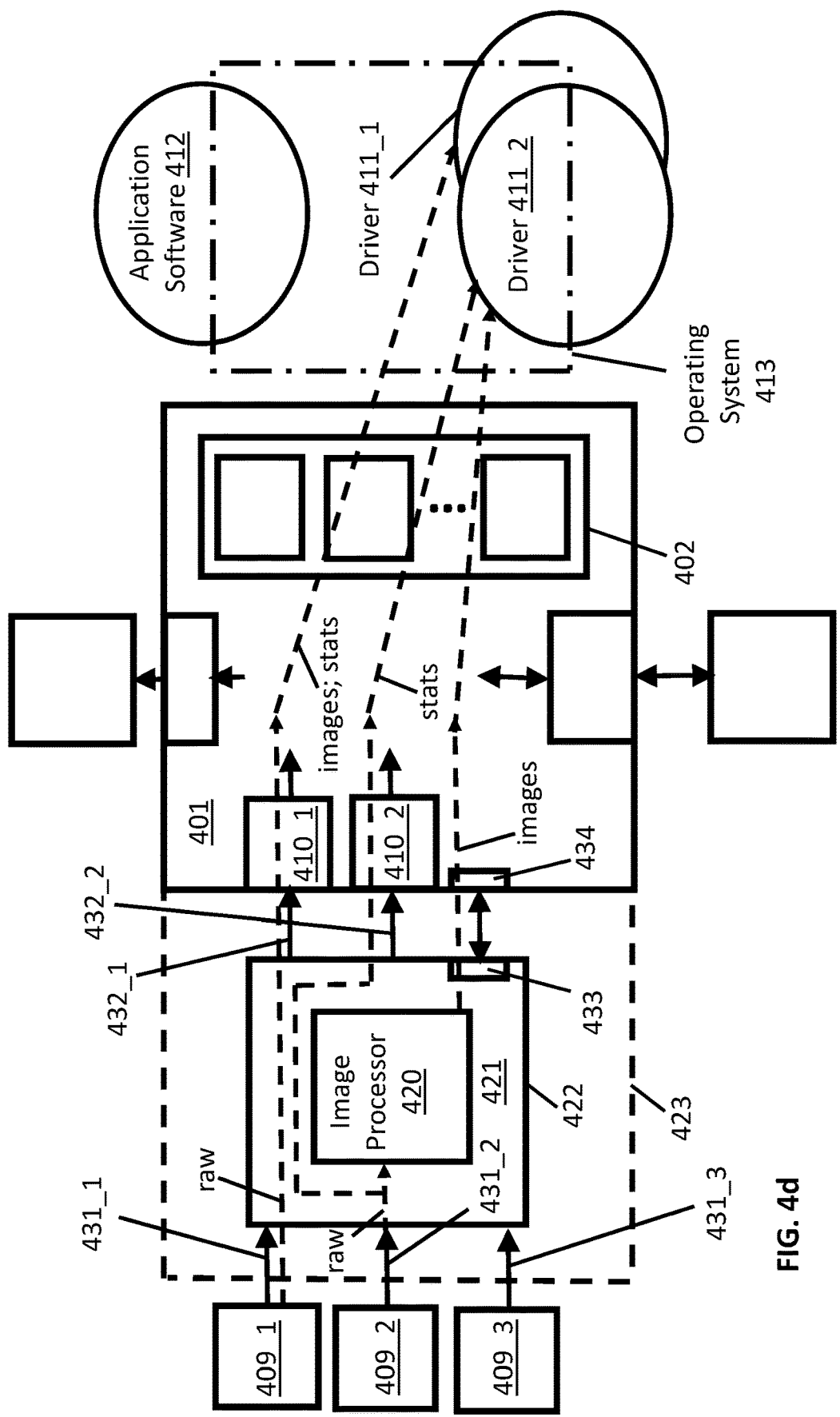

FIG. 4d shows another configuration in which the bypass mode of FIG. 4a and the image processor configuration of FIG. 4c are combined so as to concurrently operate on a same system. Here, for instance, the bypass mode of FIG. 4a may be used for a first camera 409_1, while, the discrete image processor may be used to process images from a second camera 409_2, or, second and third cameras 409_2, 409_3 (e.g., to implement stereoscopic image processing).

Here, one of the image signal processors 410_1 of the applications processor 401 processes both the images and the statistics for the first camera 409_1 while a second of the embedded image signal processors 410_2 on the applications processor 401 processes only the statistics for the second camera 409_2 or second and third cameras 409_1, 409_2. As such, the first camera's raw data is directed from a first output 432_1 of the image processor chip 422 and the second (or second and third) camera's raw data is directed from a second output 432_2 of the image processor chip 422.

In the configuration of FIG. 4d, driver software 411_1 for the first camera 409_1 sends control signals to the first camera and the embedded image signal processor 410_1 that is processing the first camera's images and statistics. Concurrently, driver software 411_2 for the second camera 409_2 (or second and third cameras 409_2, 409_3) sends control signals to the second camera 409_2 (or second and third cameras 409_2, 409_3) and the image processor 420 on the image processor chip 422.

Figure 4E:
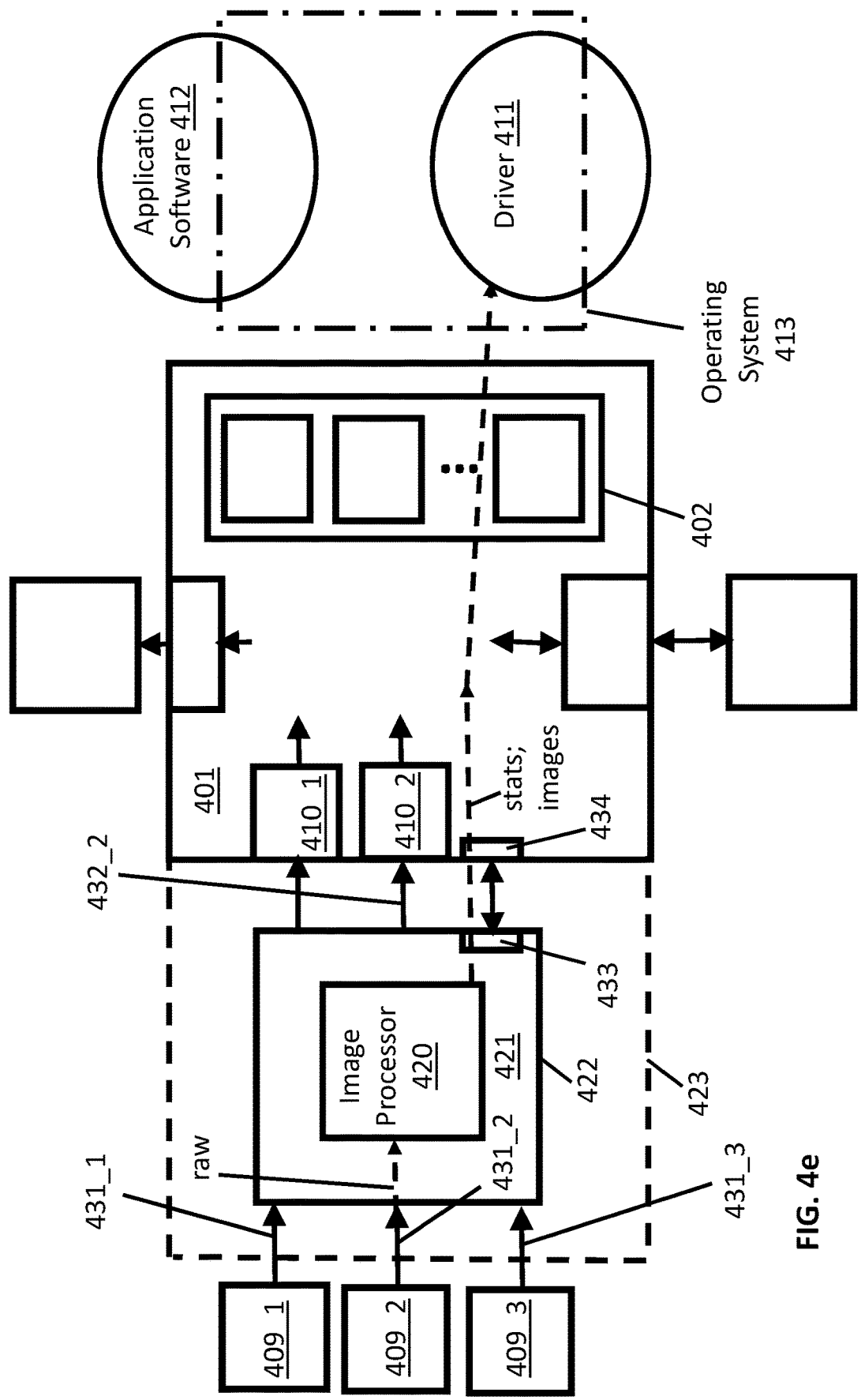

As observed in FIG. 4e, the discrete image processor is used to process images as well as generate statistics. Here, both processed images and statistics can be forwarded to the applications processor through a peripheral interface 433/434 (e.g., PCIe) rather than through either of the outputs 432_1, 432_2. In the configuration of FIG. 4e, the camera driver sends control signals to the camera and the image processor 420 based on the processed images and statistics it receives from the image processor 420. Although not depicted, the configuration of FIG. 4e may also be concurrently combined, e.g., with the bypass configuration of FIG. 4a so that, e.g., an embedded image signal processor 410_1 or 410_2 of the applications processor 401 is used to process images and statistics from a first camera 409_1 while the discrete image processor is used to process images and statistics for a second camera 409_2 (or second and third cameras 409_2, 409_3).

As alluded to above any configuration that uses the image processor 420 on the image processor chip 422 to process raw images from a camera may process over stencils of the image data to take advantage of the image processor's lower power two dimensional array architecture. Again, stencils may be processed over to perform any of, as just some examples, offset correction, noise reduction, auto-white balancing, demosaicing, sharpening, lens shading correction, color correction, tone mapping and time-frequency transforms (e.g., Fourier transforms including fast Fourier transforms, etc.) on the discrete image processor.

Also, more complex image processing algorithms, such as those discussed above with respect to HDR+, may be performed on the image processor 420 to implement the algorithms while consuming significantly less power than would otherwise be consumed if such algorithms were performed on one or more of the general purpose CPU cores 402 of the applications processor 401. For example, in order to support HDR+ mode, a running stream of images may be queued in the image processor chip's local memory (not shown in FIGS. 4a through 4g for illustrative ease). The image processor 420 may then align the images and merge more underexposed portions with fewer over-exposed portions to effect a high dynamic range image processing channel. Further still, the image processor 420 may analyze a number of images in the queue in its local memory to determine a best still shot with minimal blurring from camera or captured object movement. The image processor may also convert RGB formatted raw data to YUV, Y'UV, YCbCr or any other color space format that takes human perception into account.

Additional complex image processing tasks include, e.g., dual camera fusion which processes over image data from two cameras to implement, e.g., stereoscopic imaging, capturing wide vs. narrow field of view images, capturing color vs. monochromatic images, improving signal-to-noise (SNR) ratio, etc. Even further complex image processing tasks include, e.g., the execution of neural networks to, e.g., implement machine learning functions such as face detection (e.g., a convolutional neural network, a deep neural network, a recurrent neural network, a long short term memory network, etc.), facial recognition, product recognition (the recognition of specific marketed products), scene recognition and/or language translation. Further still, at least with respect to the configuration of FIG. 4e, the image processor 420 is used to calculate statistics without consuming large amounts of power on account of its arrayed hardware architecture.

Although not depicted in FIG. 4e specifically, in various configurations, processed images that are generated by the image processor 420 are directed to either or both of outputs 432_1, 432_2 rather than to interface 433. The image signal processor(s) 410_1, 410_2 may further process the processed images or be bypassed. In the case of the later, the processed images that are received from outputs 432_1, 432_2 may be, e.g., forwarded directly to system/main memory or to a display.

Figure 4F:
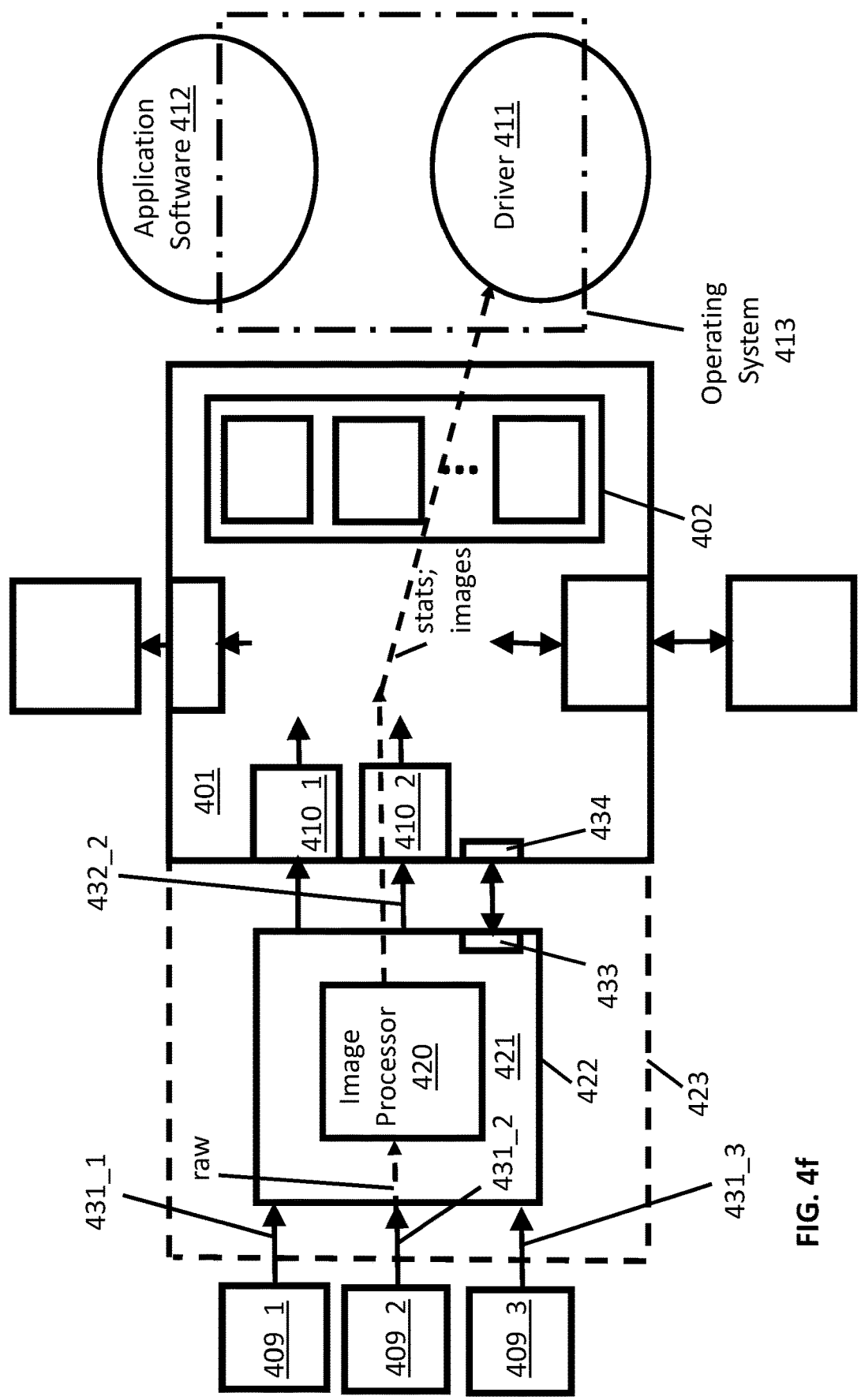

FIG. 4f shows another configuration in which the image processor 420 processes input raw information and also emits raw output information or processed images that are transmitted over output 432_2 of the processor. In the configuration of FIG. 4f, for example, the image processor 420 on the image processor chip 422 performs some image signal processing tasks while an embedded image signal processor 410_2 on the applications processor performs other image signal processing tasks, or, the image signal processor 410_2 is bypassed.

Figure 4G:
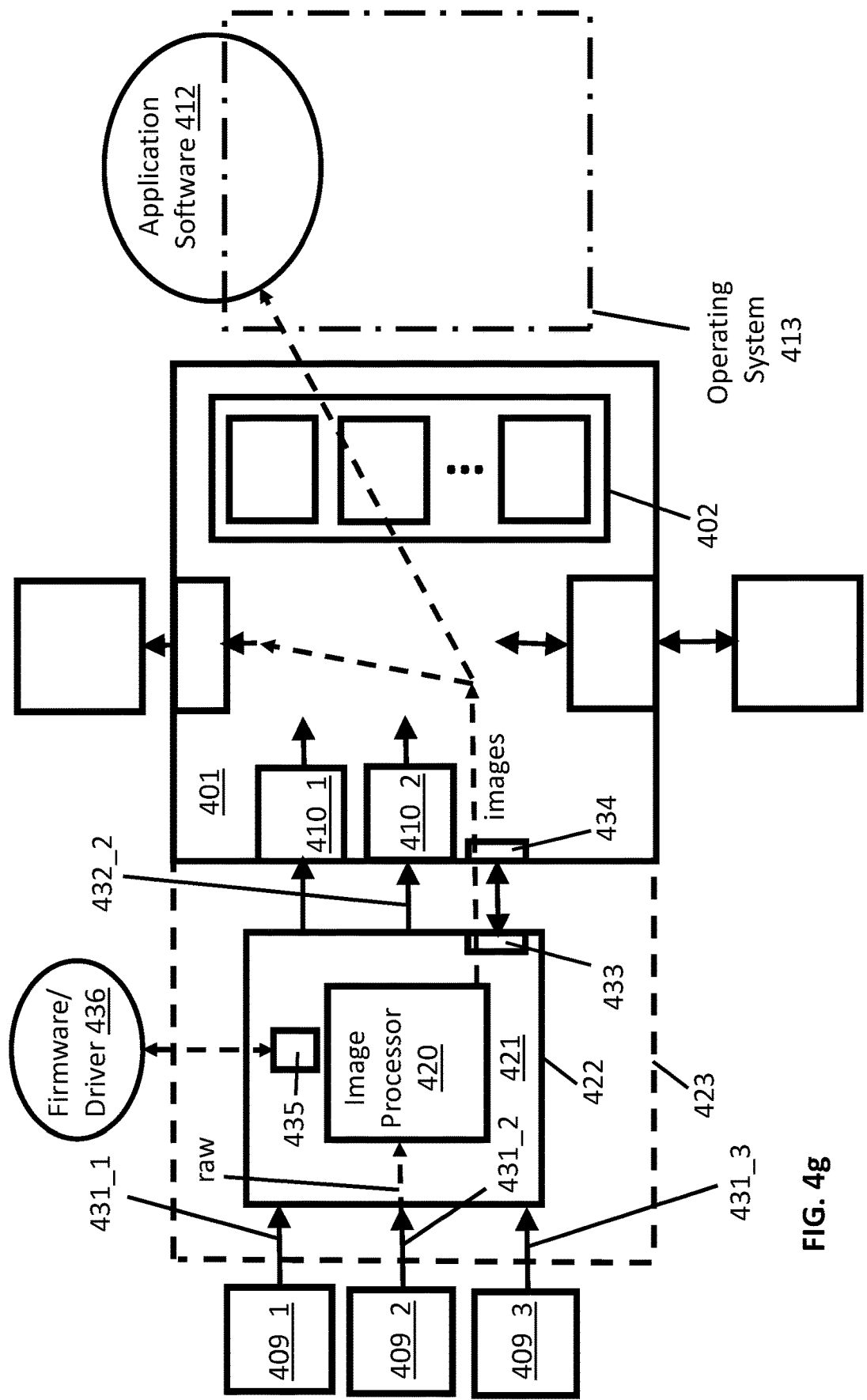

FIG. 4g shows yet another configuration in which the discrete image processing chip has an embedded general purpose processor 435 so that the firmware/driver software 436 for at least one of the cameras 409_1, 409_2, 409_3 can be executed directly on the image processor chip 422 rather than on a general purpose CPU core(s) 402 of the applications processor 401. Here, FIG. 4g includes the image processor chip configuration of FIG. 4e in which the image processor 420 is used to not only process images but also generate statistics. With both images and statistics being generated by the image processor 420, the same can be made accessible to the embedded processor 435 (e.g., directly or through the image processor chip's local memory) so that firmware/driver software 436 that is executing on the embedded processor 435 can generate control signals for both the image processor and one or more cameras locally from the image processor chip. Again, the processed images and/or statistics that are generated by the image processor may be directed over either or both of outputs 410_1, 410_2.

Note that the approach of FIG. 4g could be combined, e.g., with the approach of FIG. 4a so that e.g., one or more cameras have their images, statistics and control information generated locally on the image processor chip 422 (FIG. 4g) while another camera has its images, statistics and control information generated by one of the image signal processors 410_1, 410_2 on the applications processor 401.

In fact, any of the data flows for a particular camera or pair of cameras discussed above with respect to FIGS. 4a through 4g could be combined with one another to effect a myriad of possible system and image processor chip configurations. That is, any data flow for a particular camera (or pair of cameras) depicted or discussed above with respect to FIGS. 4a through 4g could be used for a first camera (or pair of cameras). The configured data flow could then be combined with any data flow for a particular camera or pair of cameras discussed above with respect to FIGS. 4a through 4g for another, different camera (or pair of cameras). Note this includes multiple instances of a same data flow configuration (e.g., the configuration of FIG. 4g could be instantiated twice, one for each of two different cameras). Thus, it is important to emphasize that FIGS. 4a through 4g only depict a limited set of the total number of possible configurations.

Figure 4H:
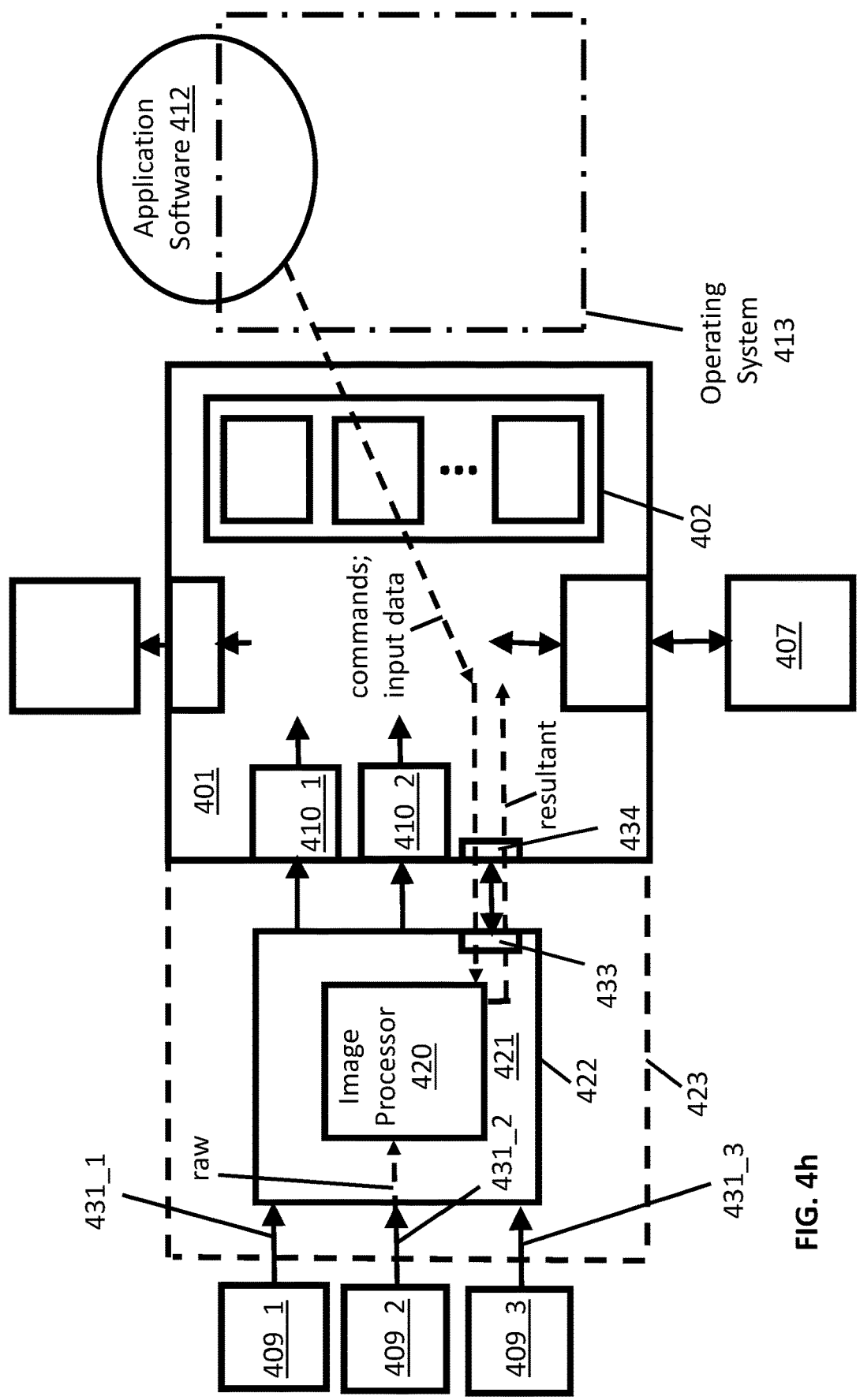

FIG. 4h shows another configuration in which the image processor 420 is used as a co-processor for one or more of the CPU cores 402 of the applications processor 401. In the configuration of FIG. 4h, rather than receiving raw image data from a camera and processing the raw data on-the-fly, instead, the input data, e.g., may instead have been created by application software 412 executing on any/all of the general purpose CPU cores 402 of the applications processor 401. Here, the general purpose processing cores and main memory subsystem of the applications processor 401 can be more generally viewed as a host system that invokes the image processor's co-processing functions. Upon the application software 412 reaching a point in which an extremely efficient image processing engine is needed to further process the data it is working on, the application software 412 will invoke the use of the image processor 420 to process the data.

As such, the input data that the image processor 420 operates on is, e.g., directed from the computing system's main memory 407 to the image processor's local memory (not shown in FIG. 4h). The application software 412 also sends one or more commands to the image processor 420 describing the specific algorithm(s) to be performed (e.g., a convolutional neural network algorithm to implement any of the aforementioned machine learning processes). The image processor 420 then executes the particular algorithms on the input data to generate the resultant output data, which, may be stored in the image processor chip's local memory before being forwarded to main memory 407 (or the output data may be directly forwarded to the main memory 407). Once the resultant output data generated by the image processor 420 is resident in main memory 407, the application software 412 can advance its program execution and operate on the resultant output data. Note that the communication of data and commands between the discrete image processor and the CPU core(s) may take place over the peripheral interface 433/434.

Note that the co-processor configuration of FIG. 4h could also be combined with one or more of the various camera data flows discussed above with respect to FIGS. 4a through 4g so that raw image camera processing and co-processing are concurrently supported by the image processor chip 422.

FIG. 5 shows an embodiment of the image processor chip 522 and its local memory 540. As observed in FIG. 5, the chip 522 includes an image processor 520 having, e.g., a plurality of stencil processors that each include an execution lane array and a two dimensional shift register array as discussed above with respect to FIG. 2. The surrounding circuitry within the chip 522 supports the various configurations discussed above with respect to FIGS. 4a through 4h.

Here, the image processor chip includes three raw camera image inputs 531_1, 531_2, 531_3 for concurrently receiving, e.g., RGB streams from three different cameras. Each of the three inputs are also routed to a pair of output multiplexers 537_1, 537_2 and a memory controller 538. Thus, besides being fed directly to the image processor 520, any of the three inputs 531_1, 531_2, 531_3 can also be forwarded directly to an output 532_1, 532_2 (e.g., for a bypass mode) or to local memory 540 (e.g., to queue image frames). The memory controller 538 arbitrates between access requests made to the local memory 540 from any of the inputs 531_1, 531_2, 531_3, the image processor 520 or the peripheral interface 533. Here, the peripheral interface 533, which as discussed above may be used to send finished output data to the applications processor and/or receive input data or commands from the applications processor (e.g., when in a co-processor mode) is also coupled to both the image processor 520 and the memory controller 538 to permit direct communication between the applications processor and the image processor 520 and/or the local memory 540. The memory controller 538 may also be coupled to the pair of output ports 532_1, 532_2 to support the transfer of information from local memory 540 to any of the output ports 532_1, 532_2.

The image processor chip 522 also includes an embedded (e.g., general purpose) processor 535. In various embodiments the embedded processor 535 manages the internal settings of the image processor chip 522 (e.g., to effect any of the image processor unit configurations of FIGS. 4a through 4h or other configuration of the image processor unit) in response to configuration register space of the image processor chip 522 being set by, e.g., system configuration firmware/software that is executing on the applications processor. As discussed above with respect to FIG. 4h, the embedded processor 535 may also execute firmware/driver software for the image processor 520 and/or a camera so as to offload these tasks from the general purpose CPU cores of the applications processor.

Note that each of output ports 532_1, 532_2 and peripheral interface 533 may be deemed to include an output of the image processor chip 522. As discussed above, in an embodiment, output ports 532_1, 532_2 are implemented as MIPI interfaces and peripheral interface 533 is implemented as a PCIe interface. Generally, MIPI interfaces are lower level physical layer interfaces that support traffic flow in mainly one direction (uni-directional interface) whereas a PCIe interface includes higher level functions (e.g., data link and transaction layers) and readily supports traffic flow in two directions (bi-directional). Regardless, each of the output ports 532_1, 532_2 and peripheral interface 533 are available to send information from the image processor chip 522 and therefore can be characterized as including an output of the image processor chip 522.

Note that, in various configurations, different output streams could be multiplexed through a same output (such as forwarding different output streams through peripheral interface 533). Further still, in various configurations, a same output stream could be broadcast from more than one of the outputs (e.g., a single output stream, e.g., received at one of inputs 531_1, 531_2, 531_3, could be emitted from more than one of outputs 532_1, 532_2, 533). Likewise, in yet another configuration possibility, a same input stream (e.g., receive at one of the inputs) could be directed to both an output port directly and to the image processor 520 and/or memory interface 538. Additionally, as stated above, two or more different input streams received at respective different inputs could be concurrently routed to two or more different outputs (e.g., an input stream received at input 531_1 is routed to output 532_1 while an input stream received at input 531_2 is routed to output 532_2).

Further still, two or more different input image streams received at respective, different inputs could be routed to the image processor 520 directly and/or indirectly (via memory interface 538 and memory 540). The image processor 520 could process the two input image streams to generate two respective, different processed output image streams which are, e.g., directed to two different respective outputs (e.g., output 532_1 and output 532_2). Alternatively the image processor 520 could process the multiple input image streams to generate a single output image stream that is routed, e.g., to one or more different outputs. Further still, a single input image stream could be received at one of the inputs 531_1, 531_2, 531_3 and routed to the image processor 520 directly or indirectly. The image processor could then process the input image stream to generate more than one processed output image stream. The multiple processed output image streams could then be routed to different, respective outputs of the image processing chip 522 (e.g., outputs 532_1, 532_2).

Here, the circuitry observed in between lines 545_1, 545_2 can be viewed as an internal network within the image processor chip 522 that enables the image processor chip 522 to support the various/different configurations and associated internal data flows described at length above. In various embodiments, a particular routing scheme is configured for the network by setting appropriate network configuration parameters via embedded processor 535. Although not depicted in FIG. 5 for illustrative ease, the network may also include route paths between any of inputs 531_1, 531_2, 531_3 and peripheral interface 533 so that the peripheral interface 533 can be used as an output for, e.g., a bypass arrangement for an input image stream that is received at any of inputs 531_1, 531_2, 531_3.

In various embodiments the program code that is executed by the image processor may be stored in non volatile storage (e.g., a non volatile memory device, a hard disk drive, etc.). The non volatile storage may be the host system's main non volatile storage, or, e.g., a non volatile storage component that is largely associated with the image processor unit. During boot-up and/or as needed during runtime, e.g., the program code is loaded from the non volatile storage into the memory that the image processor executes out of (e.g., memory 540). Non-volatile memory may be coupled within or external to the image processor unit.

Figure 6:
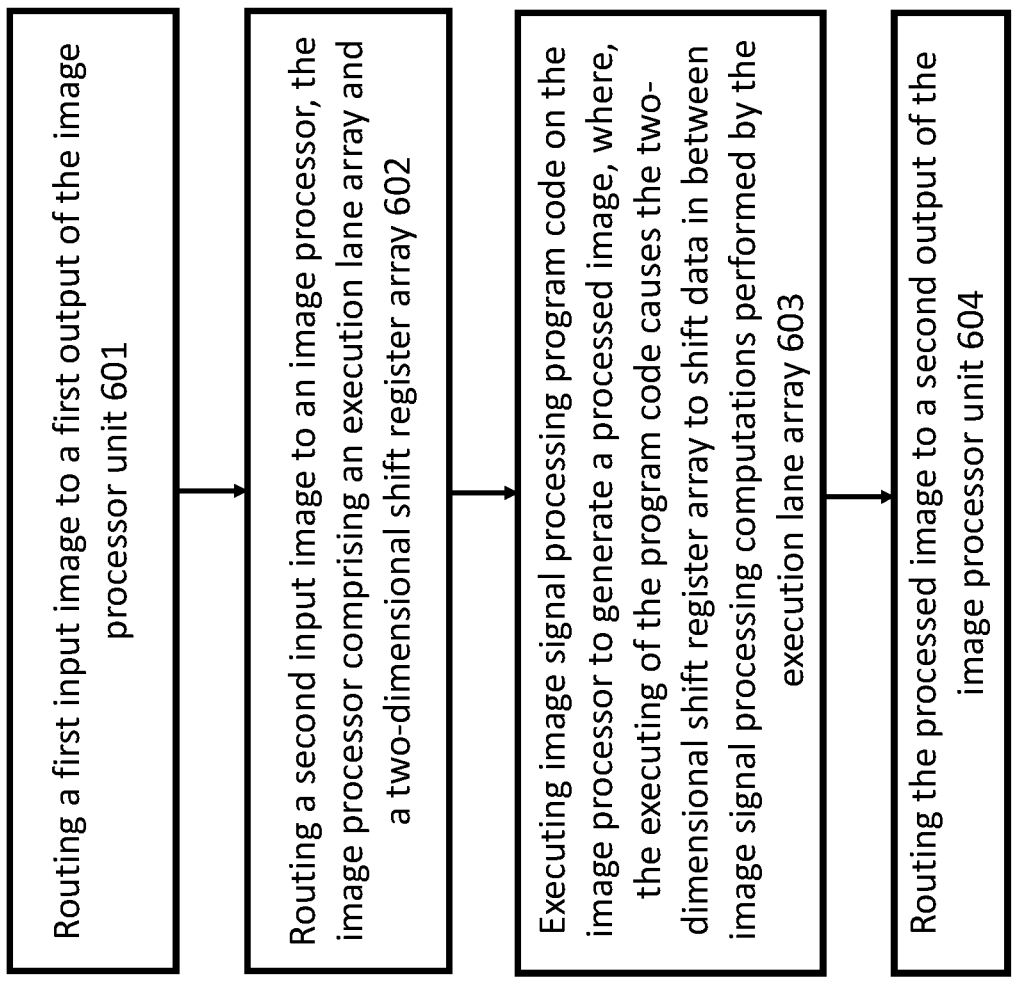
FIG. 6 shows a method performed by an image processor unit.

FIG. 6 shows a method of operating an image processor unit as described above. The method includes routing a first input image to a first output of the image processor unit 601. The method also includes routing a second input image to an image processor, the image processor comprising an execution lane array and a two-dimensional shift register array 602. The method also includes executing image signal processing program code on the image processor to generate a processed image, where, the executing of the program code causes the two-dimensional shift register array to shift data in between image signal processing computations performed by the execution lane array 603. The method also includes routing the processed image to a second output of the image processor unit 604.

4.0 Image Processor and Stencil Processor Embodiments

Figure 7:
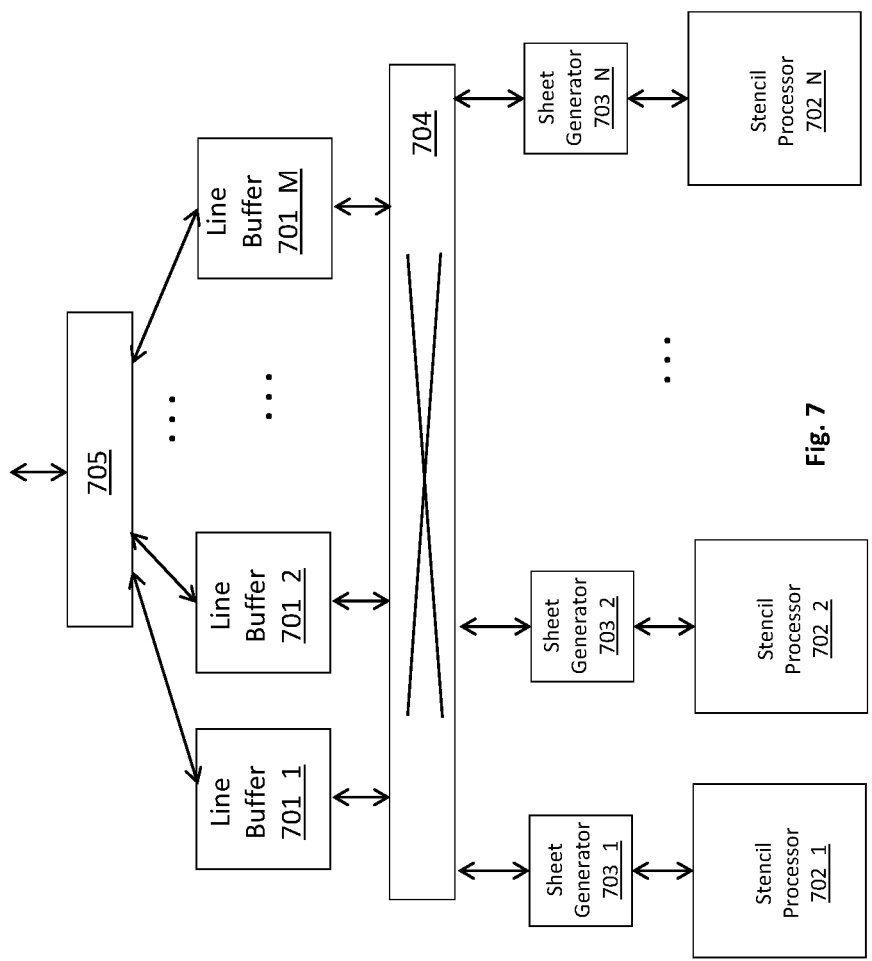
FIG. 7 shows an embodiment of an image processor hardware architecture.

FIG. 7 shows an embodiment of the hardware architecture 700 for the image processor. The image processor may be targeted, for example, by a compiler that converts program code written for a virtual processor within a simulated environment into program code that is actually executed by the hardware processor. As observed in FIG. 7, the architecture 700 includes a plurality of line buffer units 701_1 through 701_M interconnected to a plurality of stencil processor units 702_1 through 702_N and corresponding sheet generator units 703_1 through 703_N through a network 704 (e.g., a network on chip (NOC) including an on chip switch network, an on chip ring network or other kind of network). In an embodiment, any line buffer unit may connect to any sheet generator and corresponding stencil processor through the network 704.

In an embodiment, program code is compiled and loaded onto a corresponding stencil processor 702 to perform the image processing operations earlier defined by a software developer (program code may also be loaded onto the stencil processor's associated sheet generator 703, e.g., depending on design and implementation). In at least some instances an image processing pipeline may be realized by loading a first kernel program for a first pipeline stage into a first stencil processor 702_1, loading a second kernel program for a second pipeline stage into a second stencil processor 702_2, etc. where the first kernel performs the functions of the first stage of the pipeline, the second kernel performs the functions of the second stage of the pipeline, etc. and additional control flow methods are installed to pass output image data from one stage of the pipeline to the next stage of the pipeline. As such, for instance, an image processing pipeline may be readily constructed having an offset correction stage, a noise reduction stage, an auto-white balancing stage, a demosaicing stage, a sharpening stage, a lens shading correction stage, a color correction stage, a tone mapping stage and a time-frequency transform stage.

In other configurations, the image processor may be realized as a parallel machine having two or more stencil processors 702_1, 702_2 operating the same kernel program code. For example, a highly dense and high data rate stream of image data may be processed by spreading frames across multiple stencil processors each of which perform the same function.

In yet other configurations, essentially any DAG of kernels may be loaded onto the hardware processor by configuring respective stencil processors with their own respective kernel of program code and configuring appropriate control flow hooks into the hardware to direct output images from one kernel to the input of a next kernel in the DAG design.

As a general flow, frames of image data are received by a macro I/O unit 705 and passed to one or more of the line buffer units 701 on a frame by frame basis. A particular line buffer unit parses its frame of image data into a smaller region of image data, referred to as a "line group", and then passes the line group through the network 704 to a particular sheet generator. A complete or "full" singular line group may be composed, for example, with the data of multiple contiguous complete rows or columns of a frame (for simplicity the present specification will mainly refer to contiguous rows). The sheet generator further parses the line group of image data into a smaller region of image data, referred to as a "sheet", and presents the sheet to its corresponding stencil processor.

In the case of an image processing pipeline or a DAG flow having a single input, generally, input frames are directed to the same line buffer unit 701_1 which parses the image data into line groups and directs the line groups to the sheet generator 703_1 whose corresponding stencil processor 702_1 is executing the code of the first kernel in the pipeline/DAG. Upon completion of operations by the stencil processor 702_1 on the line groups it processes, the sheet generator 703_1 sends output line groups to a "downstream" line buffer unit 701_2 (in some use cases the output line group may be sent_back to the same line buffer unit 701_1 that earlier had sent the input line groups).

One or more "consumer" kernels that represent the next stage/operation in the pipeline/DAG executing on their own respective other sheet generator and stencil processor (e.g., sheet generator 703_2 and stencil processor 702_2) then receive from the downstream line buffer unit 701_2 the image data generated by the first stencil processor 702_1. In this manner, a "producer" kernel operating on a first stencil processor has its output data forwarded to a "consumer" kernel operating on a second stencil processor where the consumer kernel performs the next set of tasks after the producer kernel consistent with the design of the overall pipeline or DAG.

A stencil processor 702 is designed to simultaneously operate on multiple overlapping stencils of image data. The multiple overlapping stencils and internal hardware processing capacity of the stencil processor effectively determines the size of a sheet. Here, within a stencil processor 702, arrays of execution lanes operate in unison to simultaneously process the image data surface area covered by the multiple overlapping stencils.

As will be described in more detail below, in various embodiments) sheets of image data are loaded into a two-dimensional register array structure within the stencil processor 702. The use of sheets and the two-dimensional register array structure is believed to effectively provide for power consumption improvements by moving a large amount of data into a large amount of register space as, e.g., a single load operation with processing tasks performed directly on the data immediately thereafter by an execution lane array.

Additionally, the use of an execution lane array and corresponding register array provide for different stencil sizes that are easily programmable/configurable.

FIGS. 8a through 8e illustrate at a high level embodiments of both the parsing activity of a line buffer unit 701, the finer grained parsing activity of a sheet generator unit 703 as well as the stencil processing activity of the stencil processor 702 that is coupled to the sheet generator unit 703.

FIG. 8a depicts an embodiment of an input frame of image data 801. FIG. 8a also depicts an outline of three overlapping stencils 802 (each having a dimension of 3 pixels×3 pixels) that a stencil processor is designed to operate over. The output pixel that each stencil respectively generates output image data for is highlighted in solid black. For simplicity, the three overlapping stencils 802 are depicted as overlapping only in the vertical direction. It is pertinent to recognize that in actuality a stencil processor may be designed to have overlapping stencils in both the vertical and horizontal directions.

Because of the vertical overlapping stencils 802 within the stencil processor, as observed in FIG. 8a, there exists a wide band of image data within the frame that a single stencil processor can operate over. As will be discussed in more detail below, in an embodiment, the stencil processors process data within their overlapping stencils in a left to right fashion across the image data (and then repeat for the next set of lines, in top to bottom order). Thus, as the stencil processors continue forward with their operation, the number of solid black output pixel blocks will grow right-wise horizontally. As discussed above, a line buffer unit 701 is responsible for parsing a line group of input image data from an incoming frame that is sufficient for the stencil processors to operate over for an extended number of upcoming cycles. An exemplary depiction of a line group is illustrated as a shaded region 803. In an embodiment, the line buffer unit 701 can comprehend different dynamics for sending/receiving a line group to/from a sheet generator. For example, according to one mode, referred to as "full group", the complete full width lines of image data are passed between a line buffer unit and a sheet generator. According to a second mode, referred to as "virtually tall", a line group is passed initially with a subset of full width rows. The remaining rows are then passed sequentially in smaller (less than full width) pieces.

With the line group 803 of the input image data having been defined by the line buffer unit and passed to the sheet generator unit, the sheet generator unit further parses the line group into finer sheets that are more precisely fitted to the hardware limitations of the stencil processor. More specifically, as will be described in more detail further below, in an embodiment, each stencil processor consists of a two dimensional shift register array. The two dimensional shift register array essentially shifts image data "beneath" an array of execution lanes where the pattern of the shifting causes each execution lane to operate on data within its own respective stencil (that is, each execution lane processes on its own stencil of information to generate an output for that stencil). In an embodiment, sheets are surface areas of input image data that "fill" or are otherwise loaded into the two dimensional shift register array.

As will be described in more detail below, in various embodiments, there are actually multiple layers of two dimensional register data that can be shifted on any cycle. For convenience, much of the present description will simply use the term "two-dimensional shift register" and the like to refer to structures that have one or more such layers of two-dimensional register data that can be shifted.

Figure 8B:
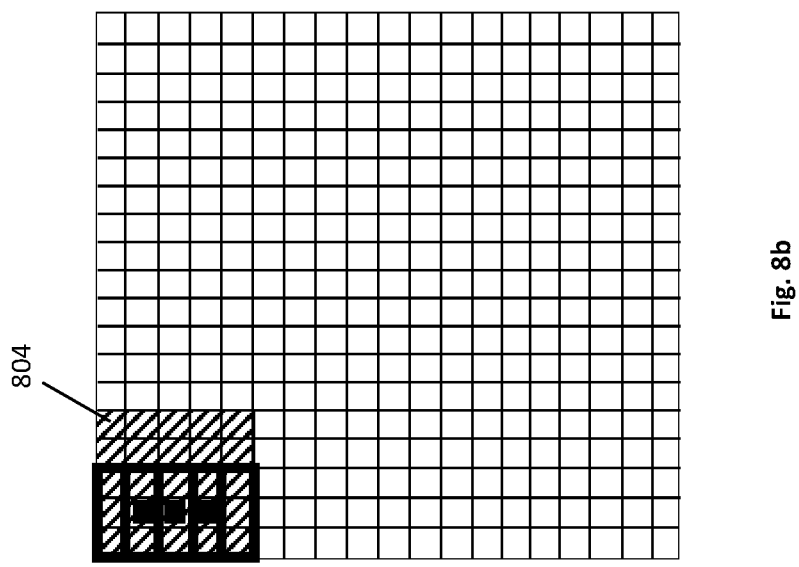
Figure 8C:
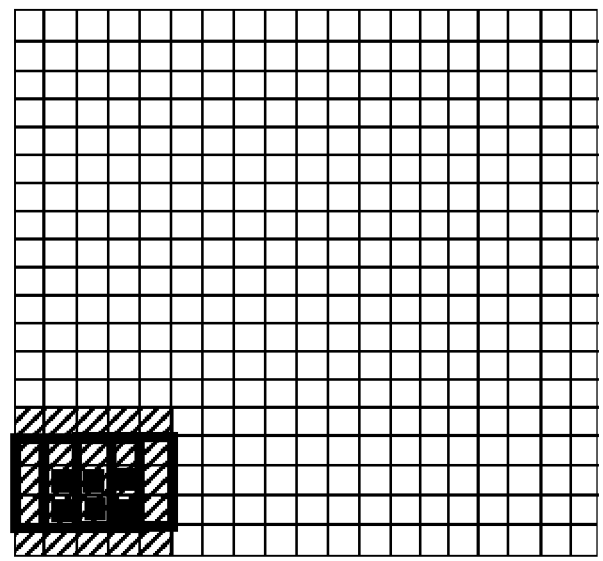
Figure 8D:
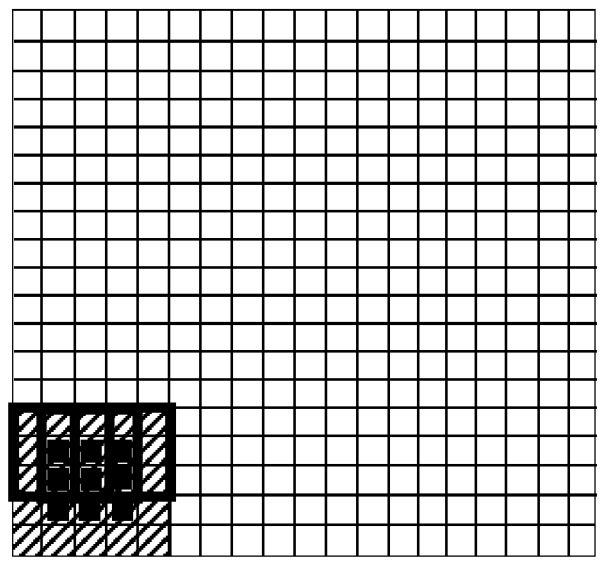

Thus, as observed in FIG. 8b, the sheet generator parses an initial sheet 804 from the line group 803 and provides it to the stencil processor (here, the sheet of data corresponds to the shaded region that is generally identified by reference number 804). As observed in FIGS. 8c and 8d, the stencil processor operates on the sheet of input image data by effectively moving the overlapping stencils 802 in a left to right fashion over the sheet. As of FIG. 8d, the number of pixels for which an output value could be calculated from the data within the sheet is exhausted (no other pixel positions can have an output value determined from the information within the sheet). For simplicity the border regions of the image have been ignored.

Figure 8E:
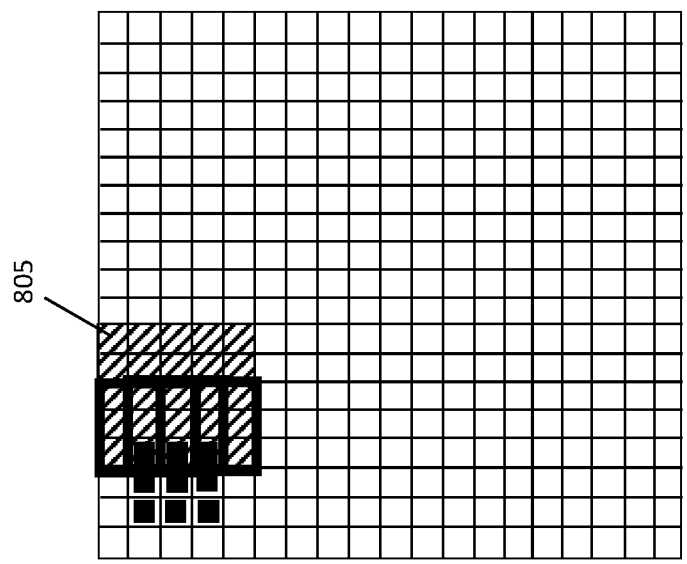

As observed in FIG. 8e the sheet generator then provides a next sheet 805 for the stencil processor to continue operations on. Note that the initial positions of the stencils as they begin operation on the next sheet is the next progression to the right from the point of exhaustion on the first sheet (as depicted previously in FIG. 8d). With the new sheet 805, the stencils will simply continue moving to the right as the stencil processor operates on the new sheet in the same manner as with the processing of the first sheet.

Note that there is some overlap between the data of the first sheet 804 and the data of the second sheet 805 owing to the border regions of stencils that surround an output pixel location. The overlap could be handled simply by the sheet generator re-transmitting the overlapping data twice. In alternate implementations, to feed a next sheet to the stencil processor, the sheet generator may proceed to only send new data to the stencil processor and the stencil processor reuses the overlapping data from the previous sheet.

Figure 9A:
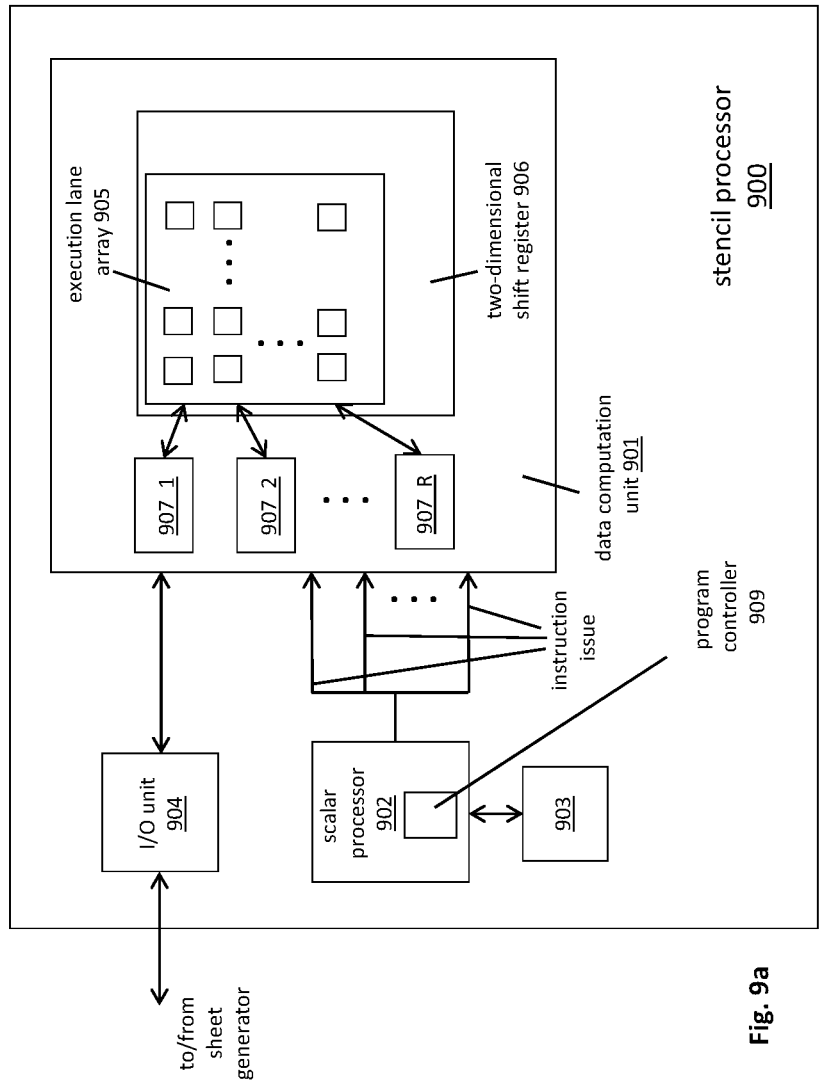
FIG. 9a shows an embodiment of a stencil processor.

FIG. 9a shows an embodiment of a stencil processor architecture 900. As observed in FIG. 9a, the stencil processor includes a data computation unit 901, a scalar processor 902 and associated memory 903 and an I/O unit 904. The data computation unit 901 includes an array of execution lanes 905, a two-dimensional shift array structure 906 and separate random access memories 907 associated with specific rows or columns of the array.

The I/O unit 904 is responsible for loading "input" sheets of data received from the sheet generator into the data computation unit 901 and storing "output" sheets of data from the stencil processor into the sheet generator. In an embodiment the loading of sheet data into the data computation unit 901 entails parsing a received sheet into rows/columns of image data and loading the rows/columns of image data into the two dimensional shift register structure 906 or respective random access memories 907 of the rows/columns of the execution lane array (described in more detail below). If the sheet is initially loaded into memories 907, the individual execution lanes within the execution lane array 905 may then load sheet data into the two-dimensional shift register structure 906 from the random access memories 907 when appropriate (e.g., as a load instruction just prior to operation on the sheet's data). Upon completion of the loading of a sheet of data into the register structure 906 (whether directly from a sheet generator or from memories 907), the execution lanes of the execution lane array 905 operate on the data and eventually "write back" finished data as a sheet directly back to the sheet generator, or, into the random access memories 907. If the later the I/O unit 904 fetches the data from the random access memories 907 to form an output sheet which is then forwarded to the sheet generator.

The scalar processor 902 includes a program controller 909 that reads the instructions of the stencil processor's program code from scalar memory 903 and issues the instructions to the execution lanes in the execution lane array 905. In an embodiment, a single same instruction is broadcast to all execution lanes within the array 905 to effect a SIMD-like behavior from the data computation unit 901. In an embodiment, the instruction format of the instructions read from scalar memory 903 and issued to the execution lanes of the execution lane array 905 includes a very-long-instruction-word (VLIW) type format that includes more than one opcode per instruction. In a further embodiment, the VLIW format includes both an ALU opcode that directs a mathematical function performed by each execution lane's ALU (which, as described below, in an embodiment may specify more than one traditional ALU operation) and a memory opcode (that directs a memory operation for a specific execution lane or set of execution lanes).

The term "execution lane" refers to a set of one or more execution units capable of executing an instruction (e.g., logic circuitry that can execute an instruction). An execution lane can, in various embodiments, include more processor-like functionality beyond just execution units, however. For example, besides one or more execution units, an execution lane may also include logic circuitry that decodes a received instruction, or, in the case of more MIMD-like designs, logic circuitry that fetches and decodes an instruction. With respect to MIMD-like approaches, although a centralized program control approach has largely been described herein, a more distributed approach may be implemented in various alternative embodiments (e.g., including program code and a program controller within each execution lane of the array 905).

The combination of an execution lane array 905, program controller 909 and two dimensional shift register structure 906 provides a widely adaptable/configurable hardware platform for a broad range of programmable functions. For example, application software developers are able to program kernels having a wide range of different functional capability as well as dimension (e.g., stencil size) given that the individual execution lanes are able to perform a wide variety of functions and are able to readily access input image data proximate to any output array location.

Apart from acting as a data store for image data being operated on by the execution lane array 905, the random access memories 907 may also keep one or more look-up tables. In various embodiments one or more scalar look-up tables may also be instantiated within the scalar memory 903.

A scalar look-up involves passing the same data value from the same look-up table from the same index to each of the execution lanes within the execution lane array 905. In various embodiments, the VLIW instruction format described above is expanded to also include a scalar opcode that directs a look-up operation performed by the scalar processor into a scalar look-up table. The index that is specified for use with the opcode may be an immediate operand or fetched from some other data storage location. Regardless, in an embodiment, a look-up from a scalar look-up table within scalar memory essentially involves broadcasting the same data value to all execution lanes within the execution lane array 905 during the same clock cycle. Additional details concerning use and operation of look-up tables is provided further below.

FIG. 9b summarizes the VLIW instruction word embodiments(s) discussed above. As observed in FIG. 9b, the VLIW instruction word format includes fields for three separate instructions: 1) a scalar instruction 951 that is executed by the scalar processor; 2) an ALU instruction 952 that is broadcasted and executed in SIMD fashion by the respective ALUs within the execution lane array; and, 3) a memory instruction 953 that is broadcasted and executed in a partial SIMD fashion (e.g., if execution lanes along a same row in the execution lane array share a same random access memory, then one execution lane from each of the different rows actually execute the instruction (the format of the memory instruction 953 may include an operand that identifies which execution lane from each row executes the instruction).

A field 954 for one or more immediate operands is also included. Which of the instructions 951, 952, 953 use which immediate operand information may be identified in the instruction format. Each of instructions 951, 952, 953 also include their own respective input operand and resultant information (e.g., local registers for ALU operations and a local register and a memory address for memory access instructions). In an embodiment, the scalar instruction 951 is executed by the scalar processor before the execution lanes within the execution lane array execute either of the other two instructions 952, 953. That is, the execution of the VLIW word includes a first cycle upon which the scalar instruction 951 is executed followed by a second cycle upon with the other instructions 952, 953 may be executed (note that in various embodiments instructions 952 and 953 may be executed in parallel).

In an embodiment, the scalar instructions executed by the scalar processor include commands issued to the sheet generator to load/store sheets from/into the memories or 2D shift register of the data computation unit. Here, the sheet generator's operation can be dependent on the operation of the line buffer unit or other variables that prevent pre-runtime comprehension of the number of cycles it will take the sheet generator to complete any command issued by the scalar processor. As such, in an embodiment, any VLIW word whose scalar instruction 951 corresponds to or otherwise causes a command to be issued to the sheet generator also includes no-operation (NOOP) instructions in the other two instruction field 952, 953. The program code then enters a loop of NOOP instructions for instruction fields 952, 953 until the sheet generator completes its load/store to/from the data computation unit. Here, upon issuing a command to the sheet generator, the scalar processor may set a bit of an interlock register that the sheet generator resets upon completion of the command. During the NOOP loop the scalar processor monitors the bit of the interlock bit. When the scalar processor detects that the sheet generator has completed its command normal execution begins again.

Figure 10:
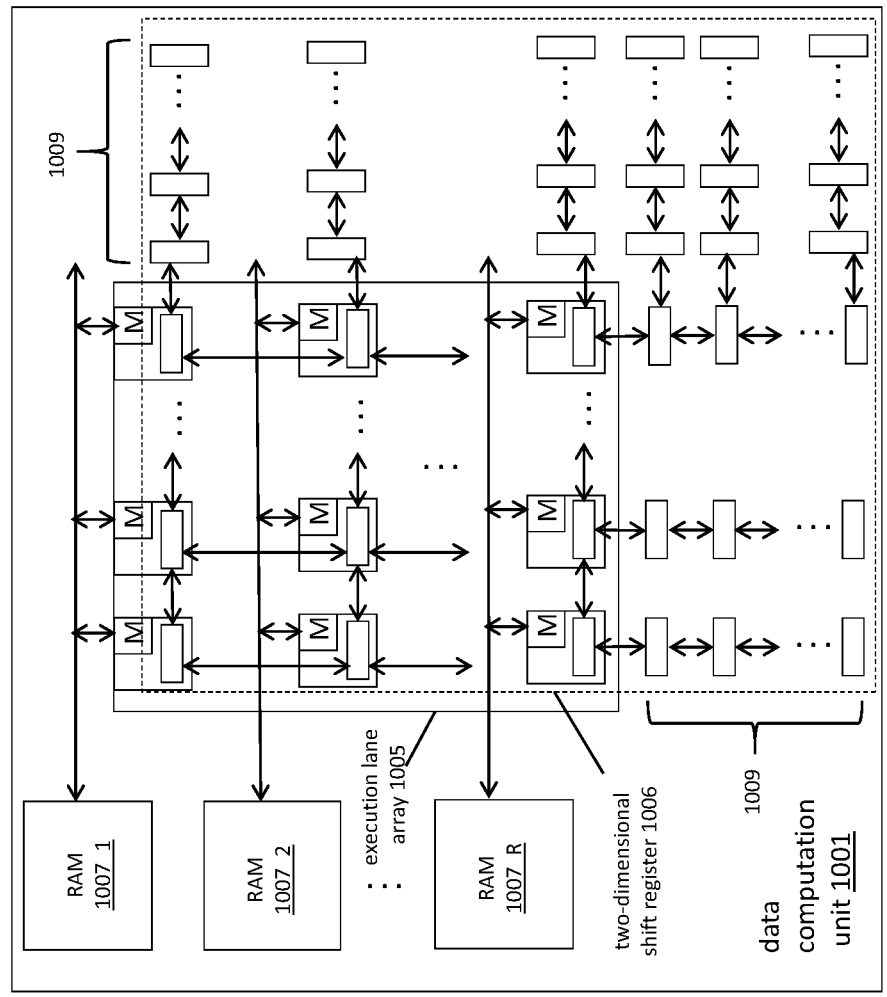
FIG. 10 shows an embodiment of a data computation unit within a stencil processor.

FIG. 10 shows an embodiment of a data computation component 1001. As observed in FIG. 10, the data computation component 1001 includes an array of execution lanes 1005 that are logically positioned "above" a two-dimensional shift register array structure 1006. As discussed above, in various embodiments, a sheet of image data provided by a sheet generator is loaded into the two-dimensional shift register 1006. The execution lanes then operate on the sheet data from the register structure 1006.

The execution lane array 1005 and shift register structure 1006 are fixed in position relative to one another. However, the data within the shift register array 1006 shifts in a strategic and coordinated fashion to cause each execution lane in the execution lane array to process a different stencil within the data. As such, each execution lane determines the output image value for a different pixel in the output sheet being generated. From the architecture of FIG. 10 it should be clear that overlapping stencils are not only arranged vertically but also horizontally as the execution lane array 1005 includes vertically adjacent execution lanes as well as horizontally adjacent execution lanes.

Some notable architectural features of the data computation unit 1001 include the shift register structure 1006 having wider dimensions than the execution lane array 1005. That is, there is a "halo" of registers 1009 outside the execution lane array 1005. Although the halo 1009 is shown to exist on two sides of the execution lane array, depending on implementation, the halo may exist on less (one) or more (three or four) sides of the execution lane array 1005. The halo 1005 serves to provide "spill-over" space for data that spills outside the bounds of the execution lane array 1005 as the data is shifting "beneath" the execution lanes 1005. As a simple case, a 5×5 stencil centered on the right edge of the execution lane array 1005 will need four halo register locations further to the right when the stencil's leftmost pixels are processed. For ease of drawing, FIG. 10 shows the registers of the right side of the halo as only having horizontal shift connections and registers of the bottom side of the halo as only having vertical shift connections when, in a nominal embodiment, registers on either side (right, bottom) would have both horizontal and vertical connections. In various embodiments, the halo region does not include corresponding execution lane logic to execute image processing instructions (e.g., no ALU is present). However, individual memory access units (M) are present in each of the halo region locations so that the individual halo register locations can individually load data from memory and store data to memory.

Additional spill-over room is provided by random access memories 1007 that are coupled to each row and/or each column in the array, or portions thereof (E.g., a random access memory may be assigned to a "region" of the execution lane array that spans 4 execution lanes row wise and 2 execution lanes column wise. For simplicity the remainder of the application will refer mainly to row and/or column based allocation schemes). Here, if an execution lane's kernel operations require it to process pixel values outside of the two-dimensional shift register array 1006 (which some image processing routines may require) the plane of image data is able to further spill-over, e.g., from the halo region 1009 into random access memory 1007. For example, consider a 6×6 stencil where the hardware includes a halo region of only four storage elements to the right of an execution lane on the right edge of the execution lane array. In this case, the data would need to be shifted further to the right off the right edge of the halo 1009 to fully process the stencil. Data that is shifted outside the halo region 1009 would then spill-over to random access memory 1007. Other applications of the random access memories 1007 and the stencil processor of FIG. 9a are provided further below.

FIGS. 11a through 11k demonstrate a working example of the manner in which image data is shifted within the two dimensional shift register array "beneath" the execution lane array as alluded to above. As observed in FIG. 11a, the data contents of the two dimensional shift array are depicted in a first array 1107 and the execution lane array is depicted by a frame 1105. Also, two neighboring execution lanes 1110 within the execution lane array are simplistically depicted. In this simplistic depiction 1110, each execution lane includes a register R1 that can accept data from the shift register, accept data from an ALU output (e.g., to behave as an accumulator across cycles), or write output data into an output destination.

Each execution lane also has available, in a local register R2, the contents "beneath" it in the two dimensional shift array. Thus, R1 is a physical register of the execution lane array while R2 is a physical register of the two dimensional shift register array. The execution lane includes an ALU that can operate on operands provided by R1 and/or R2. As will be described in more detail further below, in an embodiment the shift register is actually implemented with multiple (a "depth" of) storage/register elements per array location but the shifting activity is limited to one plane of storage elements (e.g., only one plane of storage elements can shift per cycle). FIGS. 11a through 11k depict one of these deeper register locations as being used to store the resultant X from the respective execution lanes. For illustrative ease the deeper resultant register is drawn alongside rather than beneath its counterpart register R2.

FIGS. 11a through 11k focus on the calculation of two stencils whose central position is aligned with the pair of execution lane positions 1111 depicted within the execution lane array. For ease of illustration, the pair of execution lanes 1110 are drawn as horizontal neighbors when in fact, according to the following example, they are vertical neighbors.

Figure 11A:
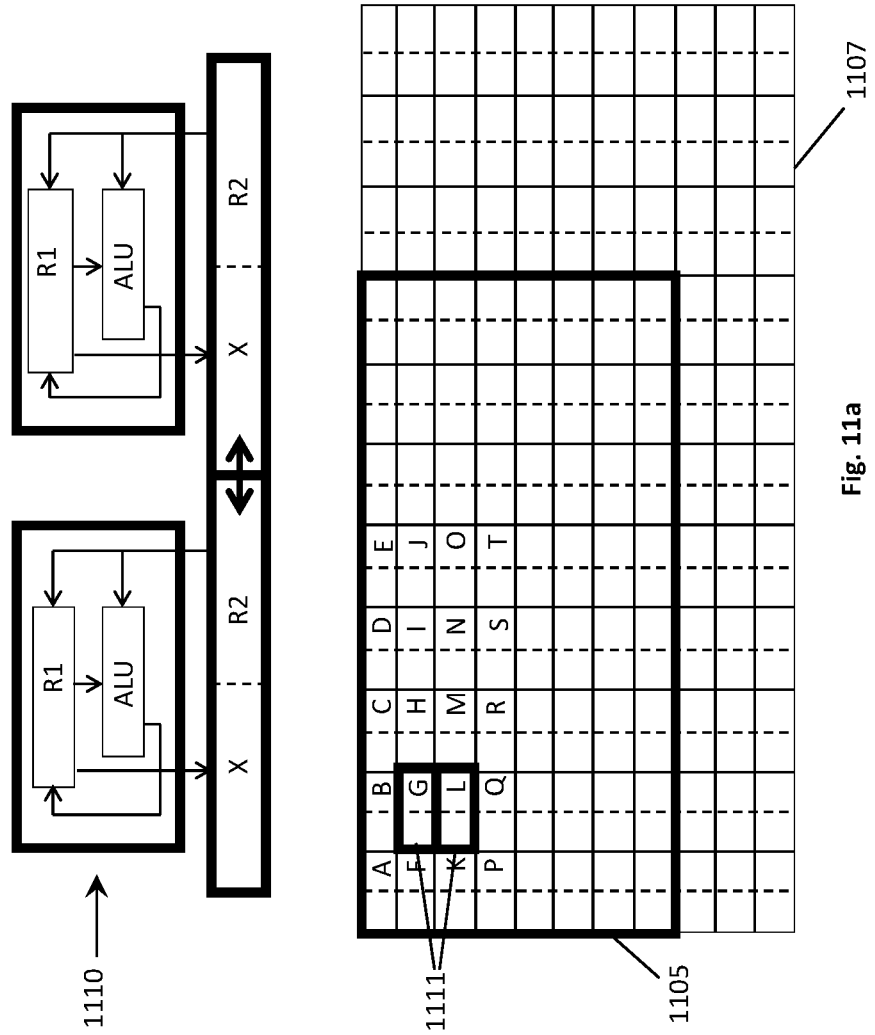
FIGS. 11a, 11b, 11c, 11d, 11e, 11f, 11g, 11h, 11i, 11j and 11k depict an example of the use of a two-dimensional shift array and an execution lane array to determine a pair of neighboring output pixel values with overlapping stencils.
Figure 11B:
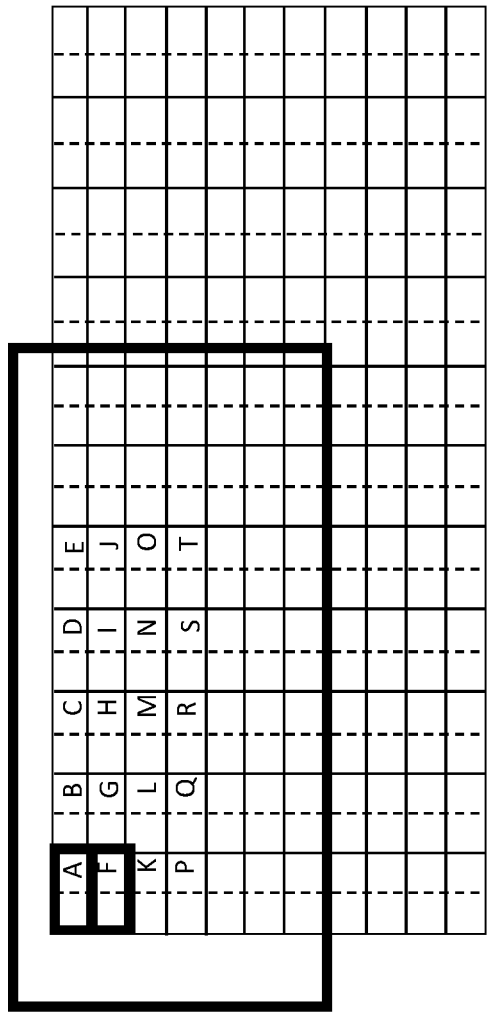

As observed initially in FIG. 11a, the execution lanes are centered on their central stencil locations. FIG. 11b shows the object code executed by both execution lanes. As observed in FIG. 11b the program code of both execution lanes causes the data within the shift register array to shift down one position and shift right one position. This aligns both execution lanes to the upper left hand corner of their respective stencils. The program code then causes the data that is located (in R2) in their respective locations to be loaded into R1.

Figure 11C:
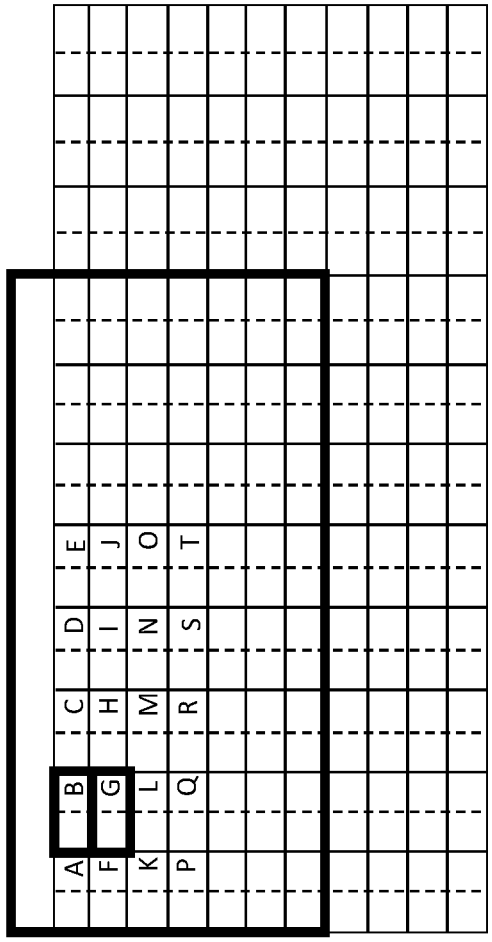
Figure 11D:
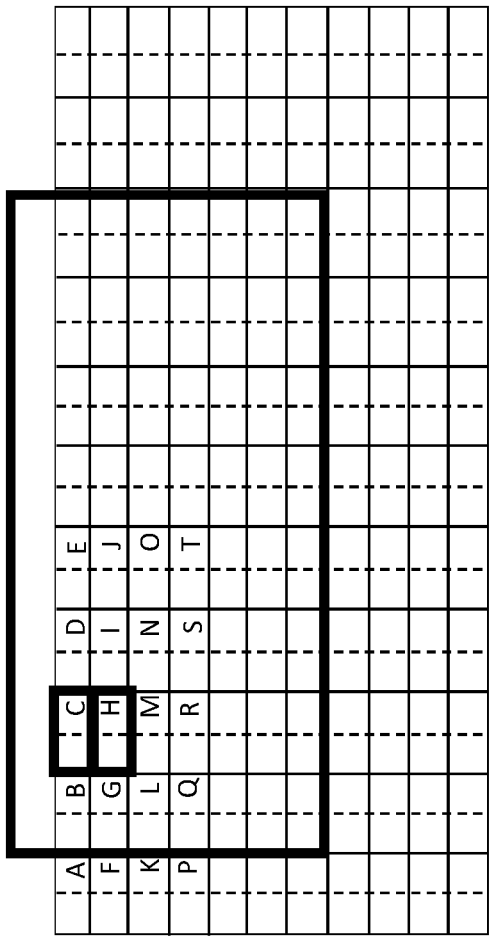

As observed in FIG. 11c the program code next causes the pair of execution lanes to shift the data within the shift register array one unit to the left which causes the value to the right of each execution lane's respective position to be shifted into each execution lane' position. The value in R1 (previous value) is then added with the new value that has shifted into the execution lane's position (in R2). The resultant is written into R1. As observed in FIG. 11d the same process as described above for FIG. 11c is repeated which causes the resultant R1 to now include the value A+B+C in the upper execution lane and F+G+H in the lower execution lane. At this point both execution lanes have processed the upper row of their respective stencils. Note the spill-over into a halo region on the left side of the execution lane array (if one exists on the left hand side) or into random access memory if a halo region does not exist on the left hand side of the execution lane array.

Figure 11E:
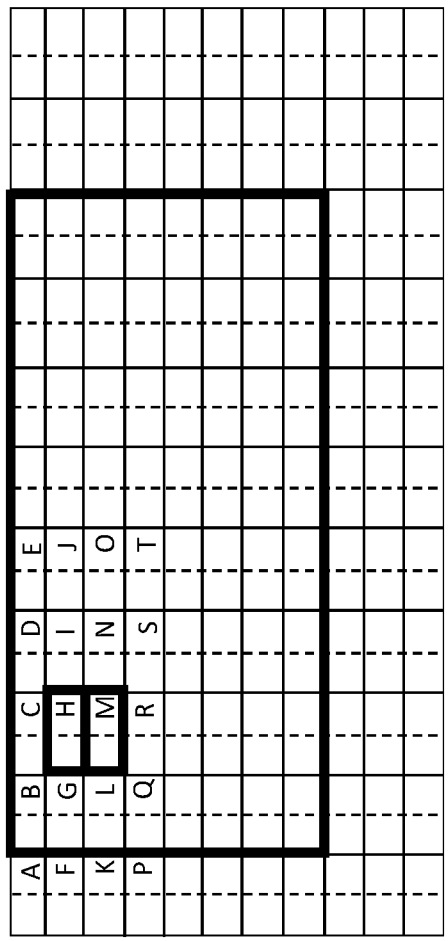
Figure 11F:
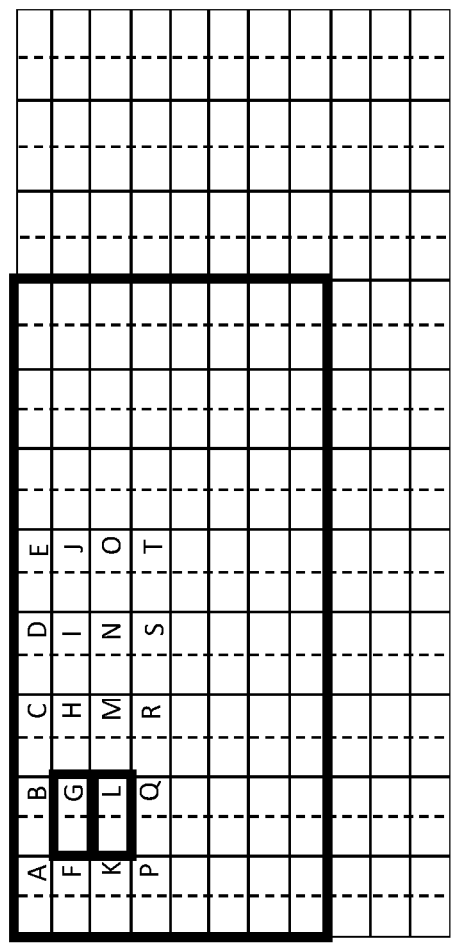
Figure 11G:
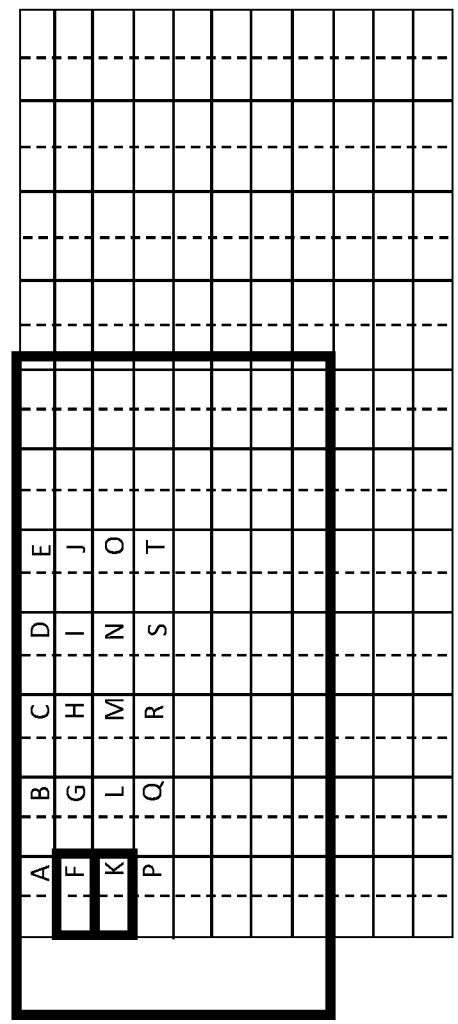

As observed in FIG. 11e, the program code next causes the data within the shift register array to shift one unit up which causes both execution lanes to be aligned with the right edge of the middle row of their respective stencils. Register R1 of both execution lanes currently includes the summation of the stencil's top row and the middle row's rightmost value. FIGS. 11f and 11g demonstrate continued progress moving leftwise across the middle row of both execution lane's stencils. The accumulative addition continues such that at the end of processing of FIG. 11g both execution lanes include the summation of the values of the top row and the middle row of their respective stencils.

Figure 11H:
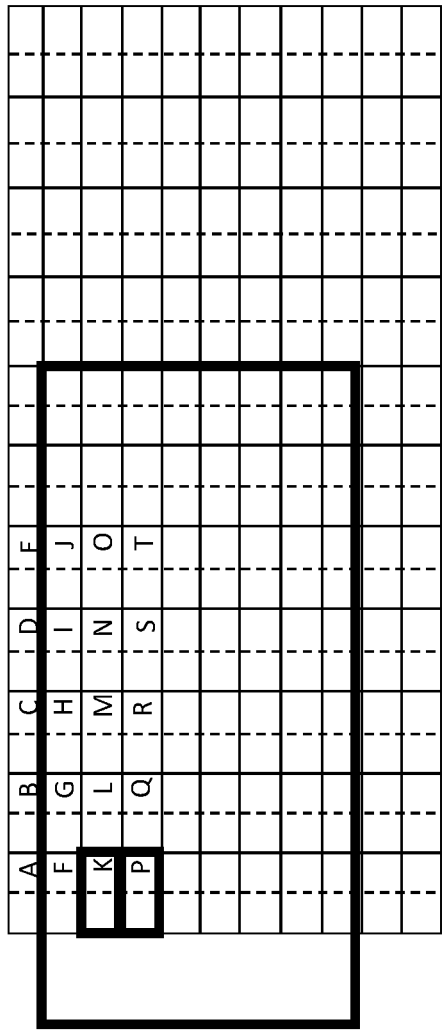
Figure 11I:
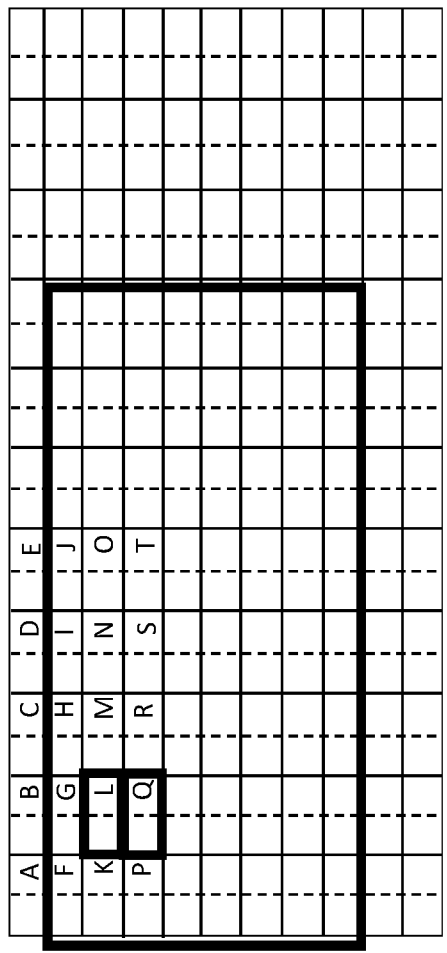
Figure 11J:
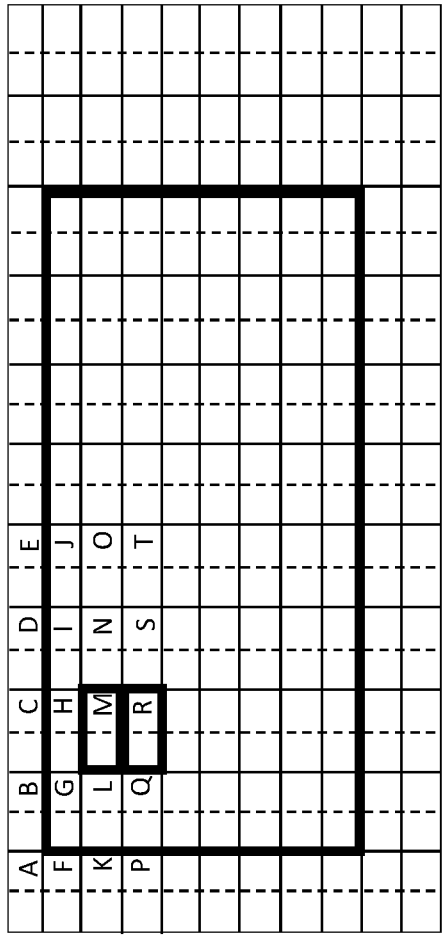
Figure 11K:
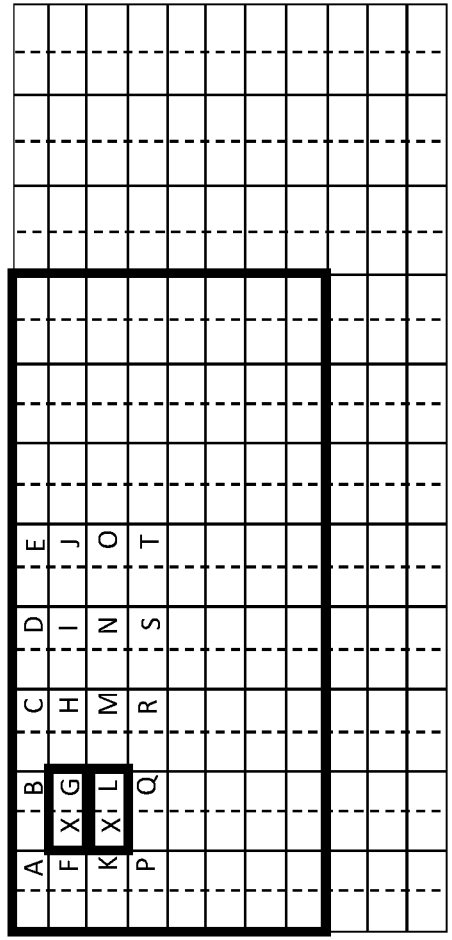

FIG. 11h shows another shift to align each execution lane with its corresponding stencil's lowest row. FIGS. 11i and 11j show continued shifting to complete processing over the course of both execution lanes' stencils. FIG. 11k shows additional shifting to align each execution lane with its correct position in the data array and write the resultant thereto.

In the example of FIGS. 11a-11k note that the object code for the shift operations may include an instruction format that identifies the direction and magnitude of the shift expressed in (X, Y) coordinates. For example, the object code for a shift up by one location may be expressed in object code as SHIFT 0, +1. As another example, a shift to the right by one location may expressed in object code as SHIFT +1, 0. In various embodiments shifts of larger magnitude may also be specified in object code (e.g., SHIFT 0, +2). Here, if the 2D shift register hardware only supports shifts by one location per cycle, the instruction may be interpreted by the machine to require multiple cycle execution, or, the 2D shift register hardware may be designed to support shifts by more than one location per cycle. Embodiments of the later are described in more detail further below.

Figure 12:
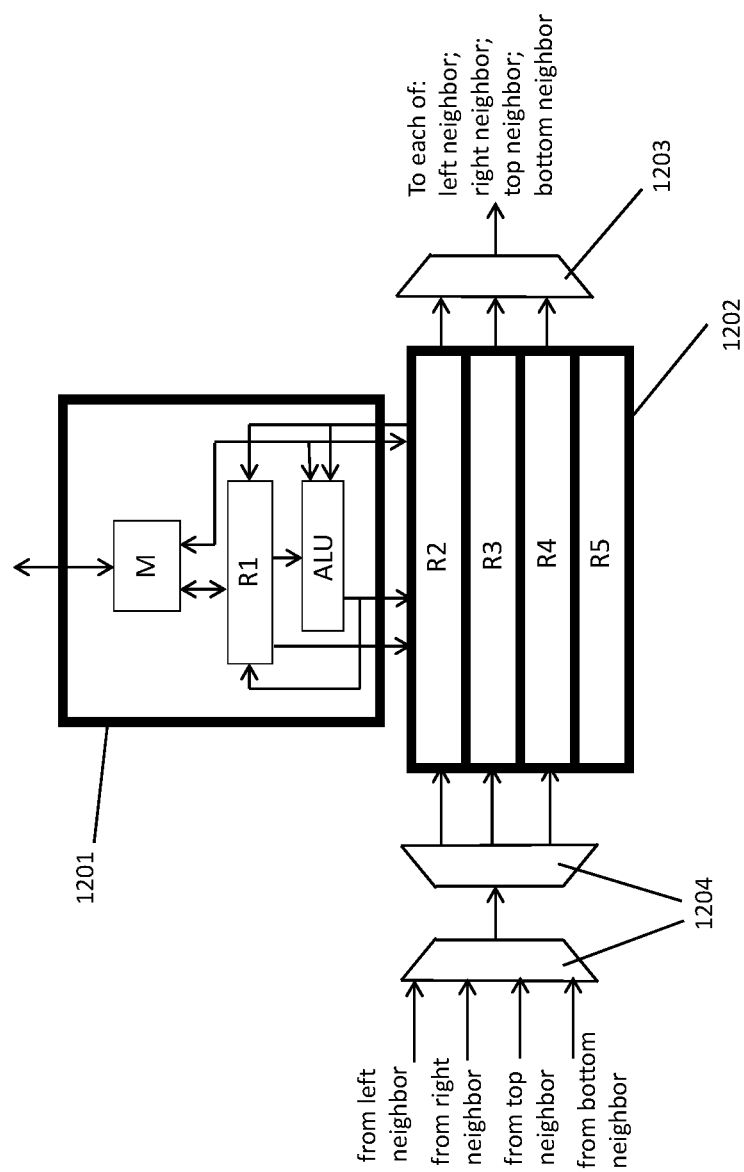
FIG. 12 shows an embodiment of a unit cell for an integrated execution lane array and two-dimensional shift array.

FIG. 12 shows another, more detailed depiction of the unit cell for an execution lane and corresponding shift register structure (registers in the halo region do not include a corresponding execution lane but do include a memory unit in various embodiments). The execution lane and the register space associated with each location in the execution lane array is, in an embodiment, implemented by instantiating the circuitry observed in FIG. 12 at each node of the execution lane array. As observed in FIG. 12, the unit cell includes an execution lane 1201 coupled to a register file 1202 consisting of four registers R2 through R5. During any cycle, the execution lane 1201 may read from or write to any of registers R1 through R5. For instructions requiring two input operands the execution lane may retrieve both of operands from any of R1 through R5.

In an embodiment, the two dimensional shift register structure is implemented by permitting, during a single cycle, the contents of any of (only) one of registers R2 through R4 to be shifted "out" to one of its neighbor's register files through output multiplexer 1203, and, having the contents of any of (only) one of registers R2 through R4 replaced with content that is shifted "in" from a corresponding one if its neighbors through input multiplexers 1204 such that shifts between neighbors are in a same direction (e.g., all execution lanes shift left, all execution lanes shift right, etc.). Although it may be common for a same register to have its contents shifted out and replaced with content that is shifted in on a same cycle, the multiplexer arrangement 1203, 1204 permits for different shift source and shift target registers within a same register file during a same cycle.

As depicted in FIG. 12 note that during a shift sequence an execution lane will shift content out from its register file 1202 to each of its left, right, top and bottom neighbors. In conjunction with the same shift sequence, the execution lane will also shift content into its register file from a particular one of its left, right, top and bottom neighbors. Again, the shift out target and shift in source should be consistent with a same shift direction for all execution lanes (e.g., if the shift out is to the right neighbor, the shift in should be from the left neighbor).

Although in one embodiment the content of only one register is permitted to be shifted per execution lane per cycle, other embodiments may permit the content of more than one register to be shifted in/out. For example, the content of two registers may be shifted out/in during a same cycle if a second instance of the multiplexer circuitry 1203, 1204 observed in FIG. 12 is incorporated into the design of FIG. 12. Of course, in embodiments where the content of only one register is permitted to be shifted per cycle, shifts from multiple registers may take place between mathematical operations by consuming more clock cycles for shifts between mathematical operations (e.g., the contents of two registers may be shifted between math ops by consuming two shift ops between the math ops).

If less than all the content of an execution lane's register files are shifted out during a shift sequence note that the content of the non shifted out registers of each execution lane remain in place (do not shift). As such, any non shifted content that is not replaced with shifted in content persists local to the execution lane across the shifting cycle. The memory unit ("M") observed in each execution lane is used to load/store data from/to the random access memory space that is associated with the execution lane's row and/or column within the execution lane array. Here, the M unit acts as a standard M unit in that it is often used to load/store data that cannot be loaded/stored from/to the execution lane's own register space. In various embodiments, the primary operation of the M unit is to write data from a local register into memory, and, read data from memory and write it into a local register.

With respect to the ISA opcodes supported by the ALU unit of the hardware execution lane 1201, in various embodiments, the mathematical opcodes supported by the hardware ALU include (e.g., ADD, SUB, MOV, MUL, MAD, ABS, DIV, SHL, SHR, MIN/MAX, SEL, AND, OR, XOR, NOT). As described just above, memory access instructions can be executed by the execution lane 1201 to fetch/store data from/to their associated random access memory. Additionally the hardware execution lane 1201 supports shift op instructions (right, left, up, down) to shift data within the two dimensional shift register structure. As described above, program control instructions are largely executed by the scalar processor of the stencil processor.

5.0 Implementation Embodiments

It is pertinent to point out that the various image processor architecture features described above are not necessarily limited to image processing in the traditional sense and therefore may be applied to other applications that may (or may not) cause the image processor to be re-characterized. For example, if any of the various image processor architecture features described above were to be used in the creation and/or generation and/or rendering of animation as opposed to the processing of actual camera images, the image processor may be characterized as a graphics processing unit. Additionally, the image processor architectural features described above may be applied to other technical applications such as video processing, vision processing, image recognition and/or machine learning. Applied in this manner, the image processor may be integrated with (e.g., as a co-processor to) a more general purpose processor (e.g., that is or is part of a CPU of computing system), or, may be a stand alone processor within a computing system.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

From the preceding sections is pertinent to recognize that an image processor as described above may be embodied in hardware on a computer system (e.g., as part of a handheld device's System on Chip (SOC) that processes data from the handheld device's camera). In cases where the image processor is embodied as a hardware circuit, note that the image data that is processed by the image processor may be received directly from a camera. Here, the image processor may be part of a discrete camera, or, part of a computing system having an integrated camera. In the case of the later the image data may be received directly from the camera or from the computing system's system memory (e.g., the camera sends its image data to system memory rather than the image processor). Note also that many of the features described in the preceding sections may be applicable to a graphics processor unit (which renders animation).

FIG. 13 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two. Additionally, the computing system of FIG. 13 also includes many features of a high performance computing system, such as a workstation or supercomputer.

As observed in FIG. 13, the basic computing system may include a central processing unit 1301 (which may include, e.g., a plurality of general purpose processing cores 1315_1 through 1315_N and a main memory controller 1317 disposed on a multi-core processor or applications processor), system memory 1302, a display 1303 (e.g., touchscreen, flat-panel), a local wired point-to-point link (e.g., USB) interface 1304, various network I/O functions 1305 (such as an Ethernet interface and/or cellular modem subsystem), a wireless local area network (e.g., WiFi) interface 1306, a wireless point-to-point link (e.g., Bluetooth) interface 1307 and a Global Positioning System interface 1308, various sensors 1309_1 through 1309_N, one or more cameras 1310, a battery 1311, a power management control unit 1312, a speaker and microphone 1313 and an audio coder/decoder 1314.

An applications processor or multi-core processor 1350 may include one or more general purpose processing cores 1315 within its CPU 1201, one or more graphical processing units 1316, a memory management function 1317 (e.g., a memory controller), an I/O control function 1318 and an image processor unit 1319. The general purpose processing cores 1315 typically execute the operating system and application software of the computing system. The graphics processing units 1316 typically execute graphics intensive functions to, e.g., generate graphics information that is presented on the display 1303. The memory control function 1317 interfaces with the system memory 1302 to write/read data to/from system memory 1302. The power management control unit 1312 generally controls the power consumption of the system 1300.

The image processor unit 1319 may be implemented according to any of the image processor unit embodiments described at length above in the preceding sections including, e.g., being integrated on an image processor unit chip that resides between the system's cameras and the system's applications processor. Alternatively or in combination, the image processor unit 1319 may be coupled to either or both of the GPU 1316 and CPU 1301 as a co-processor thereof. Additionally, in various embodiments, the GPU 1316 may be implemented with any of the image processor features described at length above. The image processor unit may also be integrated on an applications processor.

Each of the touchscreen display 1303, the communication interfaces 1304-1307, the GPS interface 1308, the sensors 1309, the camera 1310, and the speaker/microphone codec 1313, 1314 all can be viewed as various forms of I/O (input and/or output) relative to the overall computing system including, where appropriate, an integrated peripheral device as well (e.g., the one or more cameras 1310). Depending on implementation, various ones of these I/O components may be integrated on the applications processor/multi-core processor 1350 or may be located off the die or outside the package of the applications processor/multi-core processor 1350.

In an embodiment one or more cameras 1310 includes a depth camera capable of measuring depth between the camera and an object in its field of view. Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired and/or programmable logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A device comprising:
one or more cameras;
one or more processing elements; and
an image processor comprising:
one or more stencil processors, and
an embedded processor that is configured to read a configuration register space of the image processor to control in which of a plurality of operating modes the image processor operates, wherein the plurality of operating modes include:
an image processing mode wherein the image processor is configured to receive raw image inputs from the one or more cameras and to perform one or more image processing algorithms to generate output images for consumption by the one or more processing elements, and
a bypass mode wherein the image processor is configured to receive the raw image inputs from the one or more cameras and to bypass performance of the one or more image processing algorithms to provide the raw image inputs to the one or more processing elements.

2. The device of claim 1, wherein the one or more processing elements comprise an image signal processor.

3. The device of claim 2, wherein in the image processing mode, the image processor is configured to provide the output images to the image signal processor for further processing.

4. The device of claim 2, wherein in the image processing mode, the image processor is configured to generate output images and the one or more processing elements are configured to compute statistics from the raw image inputs.

5. The device of claim 4, wherein the one or more processing elements computing statistics from the raw image inputs are configured to receive the raw image inputs directly from the image processor.

6. The device of claim 5, wherein the one or more processing elements computing statistics from the raw image inputs are configured to receive the raw image inputs from a first camera of the one or more cameras, and wherein the image processor is configured to generate output images from a second camera of the one or more cameras.

7. The device of claim 1, wherein in the bypass mode, the image processor is configured to operate as a multiplexor between multiple camera inputs and one or more image processor outputs.

8. The device of claim 1, wherein in the image processing mode, the image processor is configured to generate both output images and statistics for consumption by the one or more processing elements.

9. The device of claim 1, wherein the image processor comprises an embedded CPU.

10. The device of claim 9, wherein the embedded CPU of the image processor is configured to execute a driver for one of the one or more cameras.

11. The device of claim 1, wherein the image processor is configured to operate as a co-processor by receiving input data from a main CPU and generating output data for consumption by the main CPU.

12. A method performed by a device comprising one or more cameras and an image processor comprising one or more stencil processors and an embedded processor, the method comprising:
reading, by the embedded processor, a configuration register space of the image processor that controls in which of a plurality of operating modes the image processor operates; and
configuring the image processor to operate in a particular operating mode according to the configuration register space, wherein the plurality of operating modes include:
an image processing mode wherein the image processor is configured to receive raw image inputs from the one or more cameras and to perform one or more image processing algorithms to generate output images for consumption by one or more processing elements of the device; and
a bypass mode wherein the image processor is configured to receive the raw image inputs from the one or more cameras and to bypass performance of the one or more image processing algorithms to provide the raw image inputs directly to the one or more processing elements.

13. The method of claim 12, wherein the one or more processing elements comprise an image signal processor.

14. The method of claim 13, further comprising providing, by the image processor while operating in the image processing mode, the output images to the image signal processor for further processing.

15. The method of claim 13, further comprising:
generating, by the image processor while operating in the image processing mode, output images; and
computing, by the one or more processing elements, statistics from the raw image inputs.

16. The method of claim 15, wherein the one or more processing elements computing statistics from the raw image inputs receive the raw image inputs directly from the image processor.

17. The method of claim 16, wherein the one or more processing elements computing statistics from the raw image inputs receive the raw image inputs from a first camera of the one or more cameras, and wherein the image processor is configured to generate output images from a second camera of the one or more cameras.

18. The method of claim 12, wherein in the bypass mode, the image processor is configured to operate as a multiplexor between multiple camera inputs and one or more image processor outputs.

19. The method of claim 12, further comprising generating, by the image processor while operating in the image processing mode, both output images and statistics for consumption by the one or more processing elements.

20. The method of claim 12, wherein the image processor comprises an embedded CPU.

* * * * *